(12) United States Patent
Matsugatani et al.

(10) Patent No.: US 7,206,299 B2
(45) Date of Patent: Apr. 17, 2007

(54) TERMINAL AND RELAY DEVICE

(75) Inventors: Kazuoki Matsugatani, Kariya (JP); Masumi Egawa, Kariya (JP); Jun Kosai, Kariya (JP)

(73) Assignee: DENSO Corporation, Kariy (JP)

( * ) Notice: Subject to any disclaimer, the term of this patent is extended or adjusted under 35 U.S.C. 154(b) by 1048 days.

(21) Appl. No.: 10/318,916

(22) Filed: Dec. 13, 2002

(65) Prior Publication Data

US 2003/0112803 A1    Jun. 19, 2003

(30) Foreign Application Priority Data

Dec. 14, 2001    (JP) .............................. 2001-381816

(51) Int. Cl.
*H04Q 7/00* (2006.01)
(52) U.S. Cl. ...................... 370/331; 370/338
(58) Field of Classification Search ............ 370/310.2, 370/328, 331, 338, 349, 392; 455/436, 439, 455/442
See application file for complete search history.

(56) References Cited

U.S. PATENT DOCUMENTS

| | | | |
|---|---|---|---|
| 5,636,217 A | 6/1997 | Moelard | |
| 6,108,548 A | 8/2000 | Furukawa et al. | |
| 6,731,621 B1 | 5/2004 | Mizutani et al. | |
| 6,771,962 B2* | 8/2004 | Saifullah et al. | 455/436 |
| 2002/0041605 A1* | 4/2002 | Benussi et al. | 370/467 |
| 2003/0083045 A1* | 5/2003 | Blight et al. | 455/412 |
| 2006/0268782 A1* | 11/2006 | Kwak et al. | 370/331 |

FOREIGN PATENT DOCUMENTS

| | | |
|---|---|---|
| EP | 1 009 141 | 6/2000 |
| EP | 1 011 243 | 6/2000 |
| JP | 04-242353 | 8/1992 |
| JP | 08-326805 | 12/1997 |
| JP | 09-326805 | 12/1997 |
| JP | 11-127184 | 5/1999 |
| JP | 2001-016253 | 1/2001 |

* cited by examiner

*Primary Examiner*—Brenda Pham
(74) *Attorney, Agent, or Firm*—Harness, Dickey & Pierce, PLC

(57) ABSTRACT

A terminal has a radio device TD1 for connection by radio communication, a terminal router CR1, and terminal segment C.1. The radio device TD1 uses a temporary terminal address while being connected to the same base transceiver station segment B.x. In the terminal segment C.1, an application uses a constant terminal specific address. The terminal router CR1 informs a base transceiver station gateway, which relays the communication data and exchange the path information with the data relay devices on the Internet, of the path information that the data communication to the terminal specific address goes through the temporary terminal address.

4 Claims, 13 Drawing Sheets

- TERMINAL CNTL TABLE

| SEGMENT | PREVIOUS GATEWAY | NUMBER OF TIMES OF MOVEMENT |
|---|---|---|
| C.1 | BR1 | 2 |
| C.2 | BR1 | 1 |
| C.3 | BR4 | 4 |
| C.4 | BR3 | 2 |

FIG. 3A

- ROUTING TABLE [BR1]

| NETWORK | GATEWAY | DEVICE | METRIC |
|---|---|---|---|
| B.1 | — | dev1 | 0 |
| C.1 | CR1 | dev1 | 1 |
| default | NR1 | dev0 | 0 |

- ROUTING TABLE [BR2]

| NETWORK | GATEWAY | DEVICE | METRIC |
|---|---|---|---|
| B.2 | — | dev1 | 0 |
| default | NR2 | dev0 | 0 |

- ROUTING TABLE [CR1]

| NETWORK | GATEWAY | DEVICE | METRIC |
|---|---|---|---|
| B.1 | — | dev_a | 0 |
| C.1 | — | dev_c | 0 |
| default | BR1 | dev_a | 0 |

FIG. 3B

- ROUTING TABLE [BR1]

| NETWORK | GATEWAY | DEVICE | METRIC |
|---|---|---|---|
| B.1 | — | dev1 | 0 |
| C.1 | exCR1 (or BR2) | dev1 (or dev0) | n ($\geq 2$) |
| default | NR1 | dev0 | 0 |

- ROUTING TABLE [BR2]

| NETWORK | GATEWAY | DEVICE | METRIC |
|---|---|---|---|
| B.2 | — | dev1 | 0 |
| C.1 | CR1 | dev1 | 1 |
| default | NR2 | dev0 | 0 |

- ROUTING TABLE [CR1]

| NETWORK | GATEWAY | DEVICE | METRIC |
|---|---|---|---|
| B.2 | — | dev_a | 0 |
| C.1 | — | dev_c | 0 |
| default | BR2 | dev_a | 0 |

FIG. 13A

- ROUTING TABLE [SR1]

| NETWORK | GATEWAY | DEVICE |
|---|---|---|
| B.1.N.1 | -- | dev1 |
| C.1 | CR1 | dev1 |
| default | BR1 | dev0 |

- ROUTING TABLE [BR1]

| NETWORK | GATEWAY | DEVICE |
|---|---|---|
| B.1.N | -- | dev1 |
| B.1.W | -- | dev2 |
| C.1 | SR1 | dev1 |
| default | NR1 | dev0 |

- ROUTING TABLE [CR1]

| NETWORK | GATEWAY | DEVICE |
|---|---|---|
| B.1.N.1 | -- | dev_a |
| B.1.W | -- | dev_b |
| C.1 | -- | dev_c |
| default | SR1 | dev_a |

FIG. 13B

- ROUTING TABLE [SR1]

| NETWORK | GATEWAY | DEVICE |
|---|---|---|
| default | BR1 | dev0 |

- ROUTING TABLE [BR1]

| NETWORK | GATEWAY | DEVICE |
|---|---|---|
| B.1.W | -- | dev2 |
| C.1 | CR1 | dev2 |
| default | NR1 | dev0 |

- ROUTING TABLE [CR1]

| NETWORK | GATEWAY | DEVICE |
|---|---|---|
| B.1.W | -- | dev_b |
| C.1 | -- | dev_c |
| default | BR1 | dev_b |

FIG. 16

AFTER MOVING [APW1→APN2-1]

- ROUTING TABLE [SR1]

| NETWORK | GATEWAY | DEVICE |
|---|---|---|
| default | BR1 | dev0 |

- ROUTING TABLE [SR2]

| NETWORK | GATEWAY | DEVICE |
|---|---|---|
| B.2.N.1 | -- | dev1 |
| C.1 | CR1 | dev1 |
| default | BR2 | dev0 |

- ROUTING TABLE [BR1]

| NETWORK | GATEWAY | DEVICE |
|---|---|---|
| B.1 | -- | dev1 |
| C.1 | exCR1 (or BR2) | dev1 (or dev0) |
| default | NR1 | dev0 |

- ROUTING TABLE [BR2]

| NETWORK | GATEWAY | DEVICE |
|---|---|---|
| B.2.N | -- | dev1 |
| B.2.W | -- | dev2 |
| C.1 | SR2 | dev1 |
| default | NR2 | dev0 |

- ROUTING TABLE [CR1]

| NETWORK | GATEWAY | DEVICE |
|---|---|---|
| B.2.N.1 | -- | dev_a |
| B.1.W | -- | dev_b |
| C.1 | -- | dev_c |
| default | -- | dev_a |

TERMINAL AND RELAY DEVICE

CROSS REFERENCE TO RELATED APPLICATION

This application is based upon Japanese Patent Application No. 2001-381816, filed on Dec. 14, 2001, the contents of which are incorporated herein by reference.

BACKGROUND OF THE INVENTION

1. Field of the Invention

The present invention relates to a terminal capable of data communication with a wide area network (i.e., WAN) by radio communication through a Base Transceiver Station (i.e., BTS), and relates to an intermediary device capable of relaying data between the terminal and WAN. These devices are useful in data communication between a mobile device and a server on the Internet.

2. Related Art

In these years, communication with a WAN such as the Internet using a terminal such as a cell phone, i.e., mobile data communication is being used. This communication can be realized in a manner that a terminal communicates with a BTS, for example, a first BTS, using radio transmission and the BTS conducts data communication with the WAN through a segment, for example, a first segment, to which the first BTS belongs.

Generally, a BTS uses one address, among address space allocated to a segment to which the BTS belongs, for conducting data communication with the WAN. Since address space allocated to each segment is different than the others, when the first BTS, which communicates with the terminal, is switched to a second BTS due to the movement of the terminal, the second BTS belongs to a second segment different from the first to which the first BTS belongs, and the terminal no longer uses the address which was used while the terminal communicated with the first BTS. Therefore, the terminal uses a new address among address space in the second segment.

In the above-mentioned situation, that is, when the address used by the terminal is changed, a server communicating with the terminal on the WAN no longer identifies the terminal, thereby losing communication between the terminal and the server.

To avoid losing communication, mobile IP (Internet Protocol) has been employed. The mobile IP is used for ensuring data communication in the following manner. The terminal is allocated a home address in a predetermined segment with which the terminal communicates. When the terminal moves and has to change a segment from the predetermined one to the other, the data required by the terminal is sent to the home address. Then, a host, called a home agent, transfers the data in the home address to the terminal.

However, a data transmitting route is complicated when the terminal leaves the predetermined segment, thereby lowering the communicating efficiency. Moreover, the special device, such as the home agent, has to be equipped, and therefore, a structure of the network is inevitably complicated.

SUMMARY OF THE INVENTION

An object of the present invention is to realize data communication using a terminal simply and effectively.

In a first aspect of the invention, a terminal, which is connected to a base transceiver station by radio communication to conduct data communication with a server on a wide area network through a segment to which the base transceiver station belongs, has a radio network interface and a data-communication processing means. The radio network interface considers a temporary terminal address, which changes when the segment for communication is switched from one to the other, as its own address. The data-communication processing means can use one or more terminal specific addresses, which is constant, even if the segment is switched from one to the other. In addition, the data-communication processing means informs a data relay device, which controls a data communication path by exchanging path information for delivery of communication data to a target with others, of the path information denoting that a path of data communication to the terminal specific address goes through the temporary terminal address.

By having the temporary terminal address for connecting with the terminal specific address, and by informing the information of the data relay device, where the segment is switched to the other due to the movement of the terminal, a proper communication path can be established without changing the terminal specific address, thereby avoiding losing data communication.

Preferably, the terminal has plural radio network interfaces so as to communicate with different base transceiver stations simultaneously to keep the data communication. Therefore, for example, while keeping the data communication using one of the plural radio network interfaces, the terminal can communicate with the other base transceiver using the other radio network interface. Therefore, losing communication is prevented from occurring during handover of the base transceiver stations.

If each radio network interface associates with respective communication systems that are different from each other, for example, one communication system has a narrow service area but fast communication with a fast communication speed while the other has a broad service area but slow communication with slow communication speed, the radio network interfaces can be selected in association with the object of communication or the condition of communication.

According to second aspect of the present invention, a base transceiver station data relay device communicates path information for delivery of communication data to a target with a data relay device for relaying data communication. The base transceiver station data relay device conducts the data communication with a server on a WAN through a segment to which a base transceiver station belongs by using radio communication. The base transceiver station data relay device also has information deleting means for deleting path information that indicates the path is established through the temporary terminal address before a terminal changes a base transceiver station segment from one to the other when a predetermined time has elapsed after the terminal, which considers the temporary terminal address, which is changed when a communication segment is switched from one to the other, as its own address, and a terminal specific address, which is constant, even if the segment is switched from one to the other, as its own address, changes the temporary terminal address due to changing of the base transceiver station from one to the other. Moreover, the base transceiver station data relay device has transferring means for transferring communication data addressed to the terminal to the latest temporary terminal address of the terminal that is received after the terminal changes communication with the base transceiver station from one to the other.

By using this base station data relay device, path information is carried credibly to data relay devices. Even if it takes a long time to spread the path information throughout the WAN, old path information still remains. Therefore, the communication data addressed to the previous base station data relay device is transferred to the new temporary terminal address, thereby preventing the situation where the communication data has not be delivered.

Here, a base transceiver station data relay device is originated in a meaning that the base transceiver station data relay device has a base transceiver station serving its under.

Preferably, the base transceiver station data relay device is connected to the base transceiver station under this data relay device through at most two segments.

The communication data can be transferred to the latest temporary terminal address by using tunneling in which the communication data is sent by changing a destination address.

Preferably, the base transceiver station data relay device has a terminal control table for recoding a relationship between a terminal previously serving under this station data relay device and the other base transceiver station data relay device under which the terminal had been just before the terminal was under this base transceiver station data relay device. Moreover, the base transceiver station data relay device has updating means for informing another base transceiver station data relay device under which a new terminal, which currently is under this base transceiver station data relay device, has been previously of movement notice of the new terminal which shows a base transceiver station data relay device under which the new terminal is currently, and for writing the relationship between the new terminal and the another base transceiver station data relay device to the table when the new terminal comes under this base transceiver station data relay device. Furthermore, this base transceiver station data relay device has transmitting means for transmitting movement notice of a terminal to a base transceiver station data relay device to which the terminal has been connected when receiving the movement notice of the terminal from the other base station data relay device.

With this feature, the base transceiver station data relay device, under which the terminal has been previously, can be informed of the latest base transceiver station data relay device under which the terminal currently serves based on the movement notice of the terminal.

The terminal control table can have a record for a terminal which was under the base station data relay device in past times with respect to the number of times the terminal changes a base transceiver station data relay device to be connected after it serves under this base transceiver station data relay device. The predetermined time described above is a period of time in which the number of terminal movements becomes equal to or higher than the predetermined value.

With this feature, the old path information that is older than the predetermined value is deleted so that new path information is effective.

Preferably, the base station data relay device has priority adding means for adding priority path information to the path information denoting a path to the terminal specific address. Further, the base transceiver station data relay device, which serves on a WAN and has optimal path retrieving means serving when the old path information denoting the path to the terminal goes through the temporary terminal address in past times exists as well as the new path information denoting the path to the terminal goes through a new temporary terminal address, has the priority path data producing means for selecting the path indicated by the new path information preferentially in association with the priority path data.

With this feature, even if the old information exists as well as the new information, the new one will be selected so that frequency of communication in a deviated path becomes lowered. Therefore, efficiency in data communication will be improved.

The priority path data in the old path information to be sent to data relay devices on the WAN is, for example, regarded as a value based on the number of data relay devices intervening between the base transceiver station data relay device itself and the latest temporary terminal address.

In the data relay devices on the WAN, by determining the priority path data of the old path information for the terminal as the value based on the numbers of data relay devices through which the data passes when being sent through the base transceiver station data relay device under which the terminal was in past times to the latest temporary address, a path through which the data is sent directly will be selected.

As another example of the priority path data, the priority path information in the old path information to be sent to data relay devices on the WAN is a value based on the number of times of movement of the terminal.

By this feature, the priority data in the path information has a status that is less likely to be selected as it gets old.

The base transceiver station data relay device can have plural base transceiver stations each of which serves under different communication systems, respectively.

Where the communication system having narrower cells and the communication system having broader cells are present, cells of a narrow base transceiver station are arranged so that one or more cells of the narrow base transceiver station cover an overlapping portion of two cells in a broad base transceiver station according to the communication system having the broader cells.

Where a handover is conducted when a terminal having two radio network interfaces for different systems changes connection between broad cells, the switching between the broad cells can be performed while the terminal keeps connection with the narrow cell(s). Therefore, a so-called soft-handover can be realized.

Here, the wide area network is regarded as an aggregation of segments in a data path intervening between a base transceiver station data relay device and a server.

The base transceiver station serving under the base transceiver station data relay device is regarded as the one which requires the base transceiver station data relay device to intervene between itself and the WAN when conducting the data communication with the WAN. Moreover, the terminal connecting with this base transceiver station at that time is also regarded as the one which is under the base transceiver station data relay device. In addition, the segment between the base transceiver station data relay device and base transceiver station serving under it is regarded as the one which is under that base transceiver station data relay device.

Other features and advantages of the resent invention will become more apparent from the following detailed description made with reference to the accompanying drawings.

BRIEF DESCRIPTION OF THE DRAWINGS

FIG. 3A is a sample of a routing table showing a relationship between base transceiver station gateways BRx and a terminal router CR1;

FIG. 3B is a sample of a routing table showing a relationship between base transceiver station gateways BRx and a terminal router CR1;

FIG. 13A is a sample of a routing table showing a relationship between a base transceiver station router SR1, a base transceiver station gateway BR1 and a terminal router CR1;

FIG. 13B is a sample of a routing table showing a relationship between a base transceiver station router SR1, a base transceiver station gateway BR1 and a terminal router CR1;

FIG. 16 is a sample of a routing table showing a relationship between a base transceiver station router SRx, a base transceiver station gateway BRx and a terminal router CR1.

DETAILED DESCRIPTION OF THE PREFERRED EMBODIMENT

Figures 1, 2:
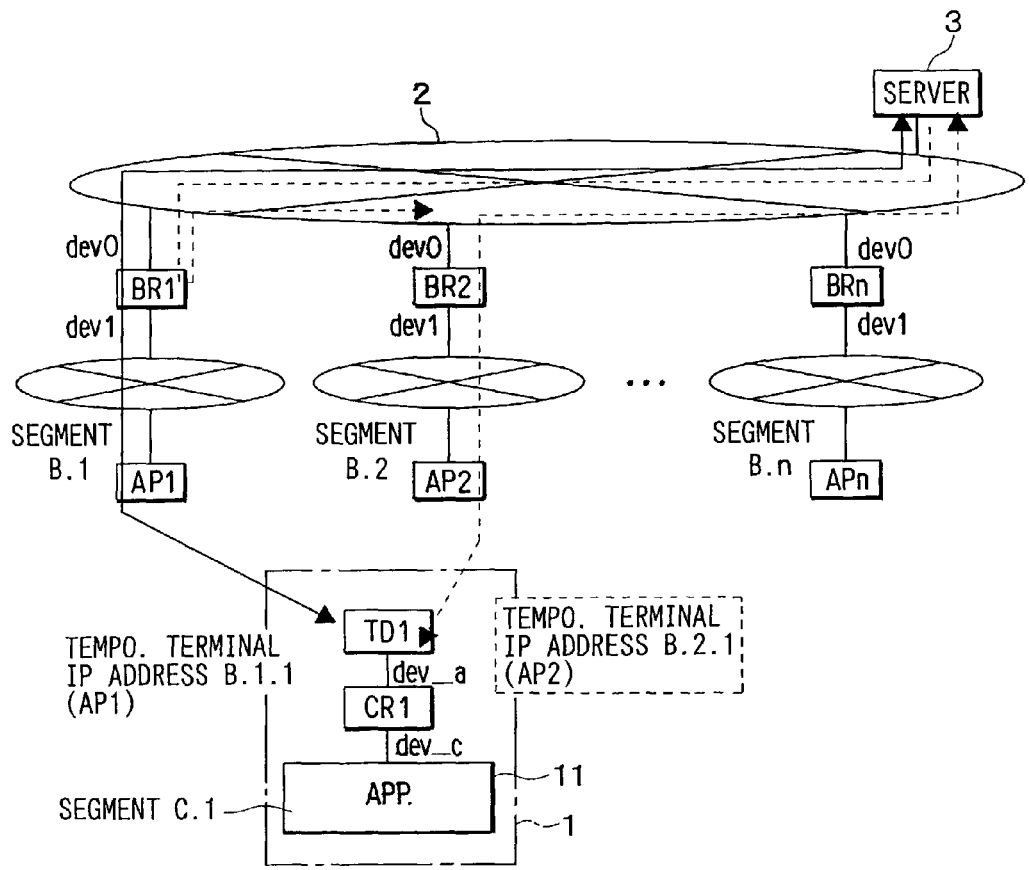
FIG. 1 is a diagram showing a data communication network in a first embodiment of the present invention.
FIG. 2 is a sample of a terminal control table of a base transceiver station gateway BRx.

Specific embodiments of the present invention will now be described hereinafter with reference to the accompanying drawings in which the same or similar component parts are designated by the same or similar reference numerals.

A first preferred embodiment of the present invention will be now described with reference to figures. As shown in FIG. 1, a server 3 and base station gateways BR1, BRA, . . . BRn (hereinafter, referred to as gateway BRx) are connected to the Internet 2. Relaying data by these gateways BRx allows base transceiver stations AP1, AP2, . . . APn (hereinafter, referred to as BTS APx or B.T. station APx) belonging to base transceiver station segments B.1, B2, . . . B.n (hereinafter, referred to as segment B.x or BTS segment B.x) to be able to communicate with the Internet 2. Mobile terminal 1 is connected to any one of the B.T. stations APx by radio in its location. Then, the mobile terminal is connected to the segment B.x through the BTS APx as an access point so as to be under the control of the segment B.x. Therefore, the mobile terminal 1 can communicate with the server 3 through the segment B.x and the Internet 2.

The Internet 2 is an aggregation of the segments. The IP (Internet Protocol) is used as a protocol for delivering the communication data between each segment.

The terminal 1 has a radio device TD1 for radio communication with the BTS APx, a terminal segment C.1 (not shown) in the terminal 1, an application 11 belonging to the terminal segment C.1, and a terminal router CR1 for relaying data communication between the radio device TD1 and the terminal segment C.1.

The radio device TD1 is provided with a temporary terminal IP address by IP address providing procedure called DHCP when performing radio communication with the BTS APx. The temporary terminal IP address is used only when the terminal 1 is located within an area of the segment B.x to which the terminal 1 is connected. Therefore, when the segment B.x is switched from one to the other due to the movement of the terminal 1, the IP address changes.

The terminal 1 has a terminal specific IP address group as an aggregate of addresses in the terminal segment C.1 that does not change even when the terminal 1 switches the connecting segment B.x from one to the other. One of the aggregate of addresses is used as a terminal specific IP address in the application 11. The application 11 communicates with the server 3 using this IP address.

The terminal router CR1, which is a relaying device between the terminal segment C.1 and the radio device TD1, uses, for the purpose of data relay, a device dev_c as a network interface at the terminal segment C.1 side and a device dev_a as another name of the radio device TD1 to send data to and receive data from respective segments at both device sides.

Moreover, the terminal router CR1 has path information for delivering the communication data to a destination as a routing table, and the terminal router CR1 communicates with the gateway BRx to be connected with the segment B.x to which the BTS APx, which currently communicates with the terminal 1, belongs.

The routing table has plural entries. Each entry has a group of four elements such as a segment of a destination, a data relay device, such as the router, the gateway or the like, through which the communication data passes at first to be delivered to that segment, a network interface for delivery of the communication data, and a metric value denoting the priority of the path. The terminal router CR1 or the other data relay devices decide a path for delivery of the data in association with the entries in the routing table. A concrete example of the routing table and the updating accompanied by the movement of the terminal 1 will be described in detail later.

The gateway BRx relays the communication data between the Internet 2 and the segment B.x. For conducting the data relay, the gateway BRx has a device dev0 and a device dev1 at sides of the Internet 2 and the segment B.x, respectively, both of which serve as a network interface to send data to and receive data from the respective sides.

In this embodiment, the gateway BRx has a DHCP server conducting the IP address providing process to serve the temporary terminal IP address capable of being used in the segment B.x to the terminal 1 which requires the connection thereto.

The gateway BRx has a terminal control table. The terminal control table keeps a record of each entry. Each entry includes a relationship among the terminal segment C.1 in the terminal 1 which was connected to the segment B.x in past times which belongs to the gateway BRx, the other gateway BRx as a previous gateway under which the terminal 1 had been just before making connection with this segment B.x, and the number of times of terminal movement that denotes the number of times that the terminal 1 changed the segment B.x to be connected after having been connected to this segment B.x. A sample of the terminal control table having plural entries for the terminal 1 is shown in FIG. 2. Each row shows each entry.

Where the terminal 1 recoded in this terminal control table in FIG. 2 is under the other gateway BRx, and then, the terminal 1 moves to be under another gateway BRx, notice of movement of the terminal 1 will be transmitted to B.T. stations connected at previous time sequentially by tracing the records of the gateways BRx in the table. Every gateway BRx which receives the notice increases the number of times the terminal 1 moves by one in every entry to be updated. Every entry is deleted when the number of times of movement of a terminal reaches a predetermined number.

The gateway BRx can add, update, or delete an entry in the terminal control table. The procedure for informing the other gateway BRx of movement of a terminal will be described in detail as follows.

Where the terminal 1 is under a gateway BRx, which does not have an entry of a terminal segment C.1 in a terminal control table, at a first time by being turned on or the like, the gateway BRx adds an entry of the terminal segment C.1 so that an item of the previous gateway is cleared and the number of times of movement is set to an initial value.

Also, where the terminal 1 moves to a gateway BRx, for example, BR1, which does not have an entry of a terminal segment C.1 in a terminal control table, from the other gateway BRx, for example, BR2, the gateway BR1 adds an entry of the terminal segment C.1 so that an item of the previous gateway is set to the gateway BR2 and the number of times of movement is set to an initial value. Then, the gateway BR1 informs the gateway BR2 of the movement of the terminal 1.

When the gateway BRx which has an entry of a terminal segment C.1 and under which the terminal 1 has not been, that is, the gateway BR2 in the above-described situation receives the notice of the movement of the terminal 1, the gateway BR2 increases the number of times of movement of the terminal 1 in the entry for the terminal 1 by one, and informs the gateway BRx which is recoded in the entry as the previous gateway of the movement of the terminal 1. If the number of times of movement of the terminal 1 in that entry reaches the predetermined value, the entry for the terminal segment C.1 is deleted.

Where the terminal 1 moves to a gateway BRx, for example, BR3, which already has had an entry of a terminal segment C.1 in a terminal control table and under which the terminal 1 is not currently, from the other gateway BRx, for example, BR4, so as to be under its control again, the gateway BR3 resets the number of times of the movement of the terminal 1 to the initial value, the gateway 3 rewrites the previous gateway in the entry to the gateway BR4 and informs the gateway BR4 of the movement of the terminal 1.

Where the terminal 1 gets, again, under a gateway BRx, for example, BR5, which already has had an entry of a terminal segment C.1 in a terminal control table and under which the terminal 1 was not just before, by being turned on or the like, the gateway BR5 resets the number of times of the movement of the terminal 1 to the initial value, the gateway 5 does not rewrite the previous gateway in the entry, and informs the gateway BRx recorded in the previous gateway in the entry of the movement of the terminal 1.

Where the gateway BRx under which the terminal 1 serves currently receives the notice of the movement of the terminal 1, in other words, where the terminal 1 moves so as to circulate among, for example, three gateways BRx so that a path of notice of the movement of the terminal 1 becomes a loop-like path, the gateways BRx neither change the terminal control table nor send the notice of the movement.

When a gateway BRx, for example, BR6, receives the communication data through the Internet 2 that is addressed to the terminal segment C.1 of the terminal 1 which was connected to the segment B.x in past times with which the gateway BR6 has the communication, the gateway BK6 sends the communication data to the terminal 1 by changing the address indicated in the communication data to a new temporary terminal IP address of the radio device TD1 in the segment B.x with which the terminal 1 is connected at that time. Following the transferring, a gateway BRx, for example, BR 7, receives the transferred data. Then, the gateway BR7 sends the transferred data to the terminal segment C.1 that is connected to the segment B.x which is connected to the gateway BR7, and that is the real address to which the data is supposed to be sent by changing the address thereof. This procedure is called tunneling.

Moreover, a gateway BRx has path information for carrying the communication data to a destination as a routing table so as to conduct so-called dynamic routing in which the gateway BRx communicates with the router on the Internet 2.

The path information handled by the data relay device will be described. The procedure for communication of the path information conducted between the data relay devices is performed by using, for example, RIP (Routing Information Protocol) or the like as the dynamic routing that is used commonly on the Internet 2. A data relay device, such as a router, a gateway or the like for relaying the data between segments on the Internet, has a routing table for keeping the path information. The data relay device gets the latest path information by exchanging information of the routing table with close data relay devices, for example, routers.

A sample of a routing table will be shown in FIGS. 3A and 3B. FIG. 3A shows routing tables for the gateway BR1, the gateway BR2, the terminal router CR1, respectively, while the terminal 1 is connected to the BTS AP1 after the terminal is turned on. FIG. 3B shows routing tables for the gateway BR1, the gateway BR2, the terminal router CR1, respectively, when the terminal 1 changes connection from the BTS 1 to the BTS 2.

Each row in the tables denotes the entry as one group of the path. Each entry has a network portion, a gateway portion, a device portion and a metric portion.

In the network portion, the name of a destination segment for delivery of the data is stored. In the gateway portion, the address of a data relay device is stored, which is located close to the data relay device, for example, the gateway BR1, and which is a data relay device to which the data is to be sent next for delivering the communication data to the destination segment. In the device portion, the name of the network is stored, which is to be used for transmitting the communication data to the data relay device to which the data is sent. In the metric portion, a metric value is stored, which serves as a basis for the data relay device to select an optimum path obtained by an optimum path retrieving algorithm.

The hop number denoting how many data relay devices the communication data passes through before reaching the destination network is a concrete sample of the metric value. Basically, the path length for the communication data gets shortened as the metric value becomes small, so that the path having the small metric value is regarded as the optimum path. In this embodiment, except the entry showing the path to the terminal segment C.1, the hop number is used as the metric value as long as it is not being described. The metric value of the entry showing the path to the terminal segment C.1 will be described later.

The relationship between each item of information in one entry will be described. Where the stored information has the network portion X, the gateway portion XR, the device portion devX and the metric portion MX, the data relay device has to send the communication data to a data relay device XR through a device devX for sending the data to a segment X. In this case, the metric value corresponds to MX. The communication data sent to the data relay device, for example, the gateway BR2 which is close to the first one, for example, the gateway BR1, by using the routing table of the gateway BR1 as the data relay device will be sent to the next data relay device that is recorded in the routing table of the gateway BR2 and to which the data is to be sent. By repeating this routine, the communication data is sent to the final destination.

As shown in FIG. 3A, the entry in the first row of the routing table for the gateway BR1 shows the path information for sending data to the segment B.1. The gateway BR1 has a direct connection with the segment B.1 by the device dev1 as shown in FIG. 1, and therefore, the gateway BR1 needs not to send the communication data to the other data relay device, but only to send the data from the device dev1. Thus, the gateway portion of that entry is null, the device portion is set to dev1, and the metric portion is set to zero.

The entry in the second row of the second row of the routing table for the gateway BR1 shows the path information for sending data to the segment C.1, i.e., the terminal 1. Although, the communication data has to be sent to the terminal segment C.1 finally through the terminal router CR1, the terminal 1 is connected to the BTS AP1 by the radio device TD1, and the gateway BR1 and the terminal router CR1 are close to each other, so that it is sufficient to send the communication data from the gateway BR1 to the terminal segment CR1 using the device dev1. Therefore, the gateway portion of this entry is set to CR1, and the device portion thereof is set to dev1. The metric portion thereof is set to "1" meaning that the data passes through the terminal router CR1 as long as the terminal 1 is connected to the segment B.1.

The entry regarding the terminal router CR1 is added when the terminal 1 makes connection with the BTS AP1, and is supposed to be deleted when the predetermined time lapses after the terminal moves so as to change the segment B.x to be connected. In this embodiment, the predetermined time is set to a term the number of times the terminal 1 changes the base transceiver station segment becomes a predetermined number after the entry of the terminal 1. Whether the number of times reaches the predetermined time or not can be determined using the number of times of movement of the terminal recorded in the entry of the terminal control table provided in the gateway BRx.

The "CR1" in the entry denotes the temporary terminal address that is provided to the radio device TD1 used by the terminal router CR1.

In the entry in the third row of the routing table, the network portion is set to "default". This is for sending the data to all the segments that are not recorded in the network portions of the other entries in the routing table. The gateway BR1 employs the devices dev1 and dev0 as the network interface. There are only the segment B.1 and the terminal segment C.1 as a segment arranged under the device dev1. Therefore, all transmissions of the data are conducted through the device dev0. For sending the data to all the segments, an upper gateway NR1 (not shown) is provided as a close data relay device that is provided with the data for the first time on the Internet 2. Accordingly, the gateway portion of this entry is set to NR1, and the device portion thereof is set to dev0. When the network portion is set to "default", it is impossible to determine the metric value by the time the path to the destination segment in the delivering path of the communication data becomes clear. Therefore, the metric value is provisionally set to "0" by the time the metric value is provided when the path is determined.

The routing table of the gateway BRx is sequentially spread by communication of the path information with the upper data relay device on the Internet 2, so that the communication data sent from a network device on the Internet 2 is delivered to the right destination. In the communication of the path information, the metric value may change. For example, the metric value in the data relay device on the Internet 2 that has the information of path to the segment C.1 as the entry of the routing table is: "the hop number from this data relay device to the gateway BR1+1".

The above-described routing table used in each data relay device for communication of the path information is provided in the terminal router C1 or the gateway BRx. When the routing table is updated properly in association with the movement of the terminal 1, the path information is transmitted to the data relay devices on the Internet. Thus, the right information of the path to the terminal segment C.1 is maintained as follows.

First, the terminal 1 is turned on within an area where the terminal 1 is able to communicate with the BTS AP1 to start data communication. In a situation where the terminal 1 changes connection from the BTS AP1 to BTS AP2, the change in each routing table in the gateway BR1, the gateway BR2 and the terminal router C1 will be described with reference to FIGS. 3A and 3B.

Each routing table in the gateway BR1, the gateway BR2 and the terminal router C1 is shown in FIG. 3A after the terminal 1 is turned on within an area where the terminal 1 is able to communicate with the BTS AP1 to start data communication.

As described above, the routing table of the gateway BR1 is set so that the communication data is directly sent to the segment B.1 using the device dev1, the data is sent to the terminal segment C.1 using the device dev1, and the data is sent to the other data relay devices using the device dev0 through the upper gateway NR1.

In the gateway BR2, the routing table is set so that the communication data is directly sent to the segment B.2 using the device dev1, and the data is sent to the other data relay devices using the device dev0 through an upper gateway NR2 (not shown) that is close to the gateway BR2. Different from the gateway BR1, the entries in the routing table of the gateway BR2 are set only for two destinations, i.e., the segment B.2 which is connected to the gateway BR2 and the others. This is because the terminal 1 is not connected to the BTS AP2.

The terminal 1 is connected with the segment B.1 by the device dev_a, i.e., the radio device TD1, and is connected to the terminal segment C.1 by the device dev_c. The routing table is set so that the communication data is directly sent to the segment B.1 using the device dev_a, the data is directly sent to the terminal segment C.1 using the device dev_c, and the data is sent to the other data relay devices using the device dev_a through the gateway BR1. The metric value in the entry for the segment B.1 is set to "1" since the path to the segment B.1 goes through the terminal router CR1.

The routing table in the gateway BR1 is transmitted to the others by communication with the upper data relay device on the Internet.

After that, assume that the terminal switches the connection from the BTS AP1 to AP2. Each routing table of the gateways BR1, BR2 and the terminal router CR1 is set as shown in FIG. 3B. The contents that change before and after the movement of the terminal 1 will be only described as follows.

In the terminal router CR1, a connection of the radio device TD1 is changed to the segment B.2, and therefore, the entry of the segment B.1 is deleted and a new entry for delivering the data directly to the segment B.2 using the device dev_a is created. The entry for default is rewritten so that the data is sent to the gateway BR2 using the device dev_a.

In the gateway BR2 with which the terminal 1 moves so as to communicate, a new entry for the terminal segment C.1 is added. The gateway portion of this entry is set to CR1 as the temporary terminal IP address of the radio device TD1 that is provided to the gateway BR2, while the device portion and the metric portion are set dev1 and "1", respectively, that are the same as those shown in FIG. 3A. As described above, contents in this routing table is transmitted to the data relay devices sequentially on the Internet 2. Therefore, the path to the terminal segment C.1 is newly established without changing the terminal specific IP address of the terminal segment C.1.

Figure 4:
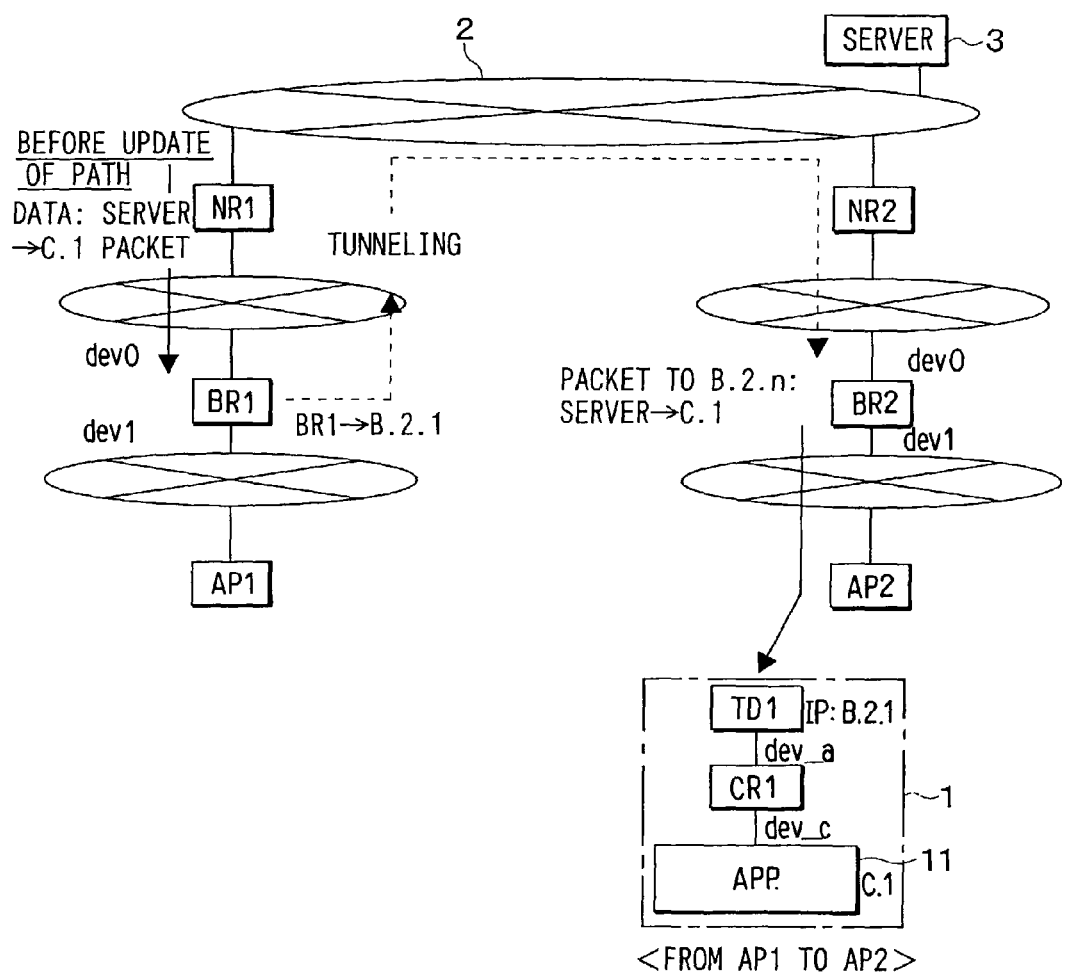
FIG. 4 is a diagram showing a data communication network of the first embodiment of the present invention where a base transceiver station gateway BRx does not belong to the same segment.

However, it might take some time to percolate the updated path information through the data relay devices on the Internet 2 sufficiently, and therefore, it might happen that the communication data addressed to the terminal segment C.1 is sent to the gateway BR1. In this case, the gateway BR1 readdresses' the communication data to a new temporary terminal address of the radio device TD1, and then, the address of the communication data is changed at the gateway BR2 so as to conduct the tunneling to deliver the data to the terminal segment C.1. The tunneling in this case and the change of the address are shown the network diagram in FIG. 4. In FIG. 4, the "B.2.1" means a new temporary terminal address of the radio device TD1.

In a situation where the old path information is deleted before the new path information is percolated sufficiently on the Internet 2, the communication data may lose the delivery destination, so that the data cannot reach the destination. To avoid this situation, the delivery method is designed so that the communication data is sent to the destination through the old path, i.e., the deviated path by tunneling until the new path is percolated through the Internet 2 entirely.

For that purpose, even if the terminal which has been connected to the gateway BR1 moves to the other segment B.x, the routing table of the gateway BR1 keeps the entry of the terminal segment C.1 the table already has had for the predetermined time. The gateway portion in the entry of the gateway BR1 is set to exCR1 denoting the temporary terminal address of the radio device TD1 when the terminal 1 has been connected to the BTS AP1. The device portion is set to dev1.

Figure 5:
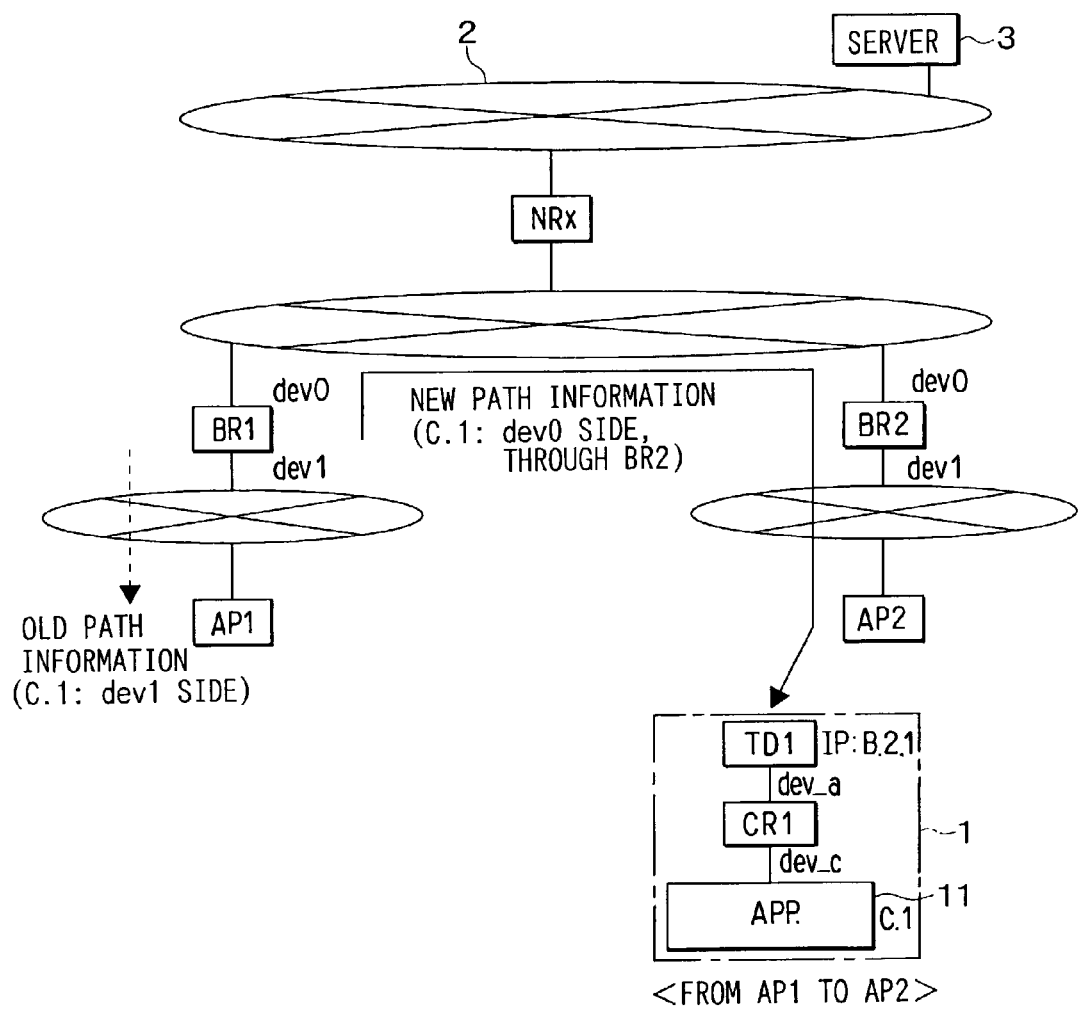
FIG. 5 is a diagram showing a data communication network of the first embodiment of the present invention where a base transceiver station gateway BRx belongs to the same segment.

However, the gateway portion and the device portion can be set to the other values in a situation where the gateway BR1 and the gateway BR2 both are connected to the same upper segment. The case where the gateway BR1 and the gateway BR2 both are connected to the same upper segment NRx is shown in FIG. 5. In this case, the data can be forwarded to the gateway BR2 whose routing table is updated soon after the terminal 1 is connected thereto, without going through the other data relay devices. In this connection, the gateway portion of the gateway BR1 is set to the IP address of the gateway BR2, and the device portion thereof is set to dev0, so that the communication data can be delivered to the terminal segment C.1 reliably without using the tunneling.

It may happen that the old path information exists together with the new path information since the old path information is not deleted for a while as described above. For the purpose of having the data relay devices on the Internet 2 recognize that the new one be selected as the proper path in this case, the metric value for the terminal segment C.1 in the routing table of the gateway BR1 is rewritten so that the metric value for the old path is bigger than that for the new one.

As a concrete metric value, an actual hop number from the gateway BR1 to the terminal segment C.1 of the terminal 1 in the new location can be applied. In this case, the actual hop number of the deviated path through the gateway BR1 from the server 3 by tunneling becomes the metric value. Therefore, in many cases, the metric value set based on the tunneling can be bigger than that of the new path from the server 3.

Or, similar to the terminal control table, the metric value for the old path can be set to the number of times of the movement of the terminal 1 after the terminal 1 is connected to the segment B.1. In this case, the metric value is increased by one while the terminal 1 moves from the segment B.x to the other segment B.x. Therefore, it is getting hard for the older path to be selected. Moreover, the number of times of the movement of the terminal 1 can be obtained from the metric value for determining whether the predetermined period has elapsed to delete the entry. In this case, it is not necessarily to record the number of times of the movement of the terminal 1 in the terminal control table.

The timing of updating of the routing table described above is shown in FIG. 6. The process will be described with reference to FIG. 6. The process is for communicating the data among the terminal 1, the BTS AP1, the gateway BR1, the BTS AP2, the gateway BR2 and the server 3 during the period after the terminal 1 is connected to the BTS AP1 until the terminal changes connection from the BTS AP1 to the BTS AP2.

First, the terminal 1 is turned on within an area where the terminal 1 is able to communicate with the BTS AP1 (PHASE I). The radio device TD1 informs the terminal router CR1 that the BTS AP1 is available and to start data communication (STEP I-1). The terminal router CR1 receiving the notice sends the request to get the temporary terminal IP address for the radio device TD1 to the gateway BR1 through the radio device TD1 and the BTS AP1 (STEP I-2). Responding to the request, the gateway BR1 informs the terminal router CR1 of the IP address provided to the radio device TD1 and the its own IP address (STEP I-3), whereby the IP address is set to the radio device TD1 (STEP I-4).

The terminal router CR1 updates its own routing table (STEP I-5), declares to use the BTS AP1, and informs the gateway BR1 of the group of terminal specific addresses used by the terminal segment C.1 (STEP I-6). In this connection, the gateway BR1 updates its own routing table and adds a new entry for the terminal segment C.1 in the terminal control table (STEP I-7). In this situation, the information regarding the connected object such as BTS, the gateway or the like in past times does not exist since the terminal 1 is connected to the BTS AP1 for the first time.

At that time, the contents of the routing tables are the same as the ones shown in FIG. 3A.

The path information updated in the gateway BR1 is transmitted to the data relay devices sequentially on the Internet 2 by dynamic routing. Thus, the application 11 in the terminal 1 can communicate with the server 3 on the Internet 2 (STEP I-8).

After that, assume that the terminal 1 moves to an area where the terminal 1 can communicate with the BTS AP2 as well as the BTS AP1 (PHASE II). At that time, the radio device TD1 informs the terminal router CR1 that the BTS AP2 is available and to start data communication (STEP II-1). The terminal router CR1 sends the request to get the temporary terminal IP address for the radio device TD1 to the gateway BR2 through the gateway BR1 from the segment B.1 (STEP II-2). Responding to the request, the gateway BR2 informs the terminal router CR1 of the IP address provided to the radio device TD1 and its own IP address (STEP II-3), whereby the IP address is set to the radio device TD1 (STEP II-4).

The terminal router CR1 updates its own routing table (STEP II-5), declares to use the BTS AP2, and informs the gateway BR2 of the group of terminal specific addresses used by the terminal segment C.1 (STEP II-6). In this connection, the gateway BR2 updates its own routing table and adds a new entry for the terminal segment C.1 in the terminal control table (STEP II-7). In this situation, the gateway BR1 is recorded according to the terminal segment C.1. Following this step, the gateway BR2 sends gateway BR1 the notice of the movement of the terminal for informing of the new temporary terminal IP address as the new connected object after the gateway BR1 or the IP address of the gateway BR2 (STEP II-8).

The gateway BR1 updates the routing table based on the notice from the gateway BR1, and increases the number of times of the movement of the terminal by one that is recorded in the entry for the terminal segment C.1 (STEP II-9). In a situation where this number of times reaches the predetermined value, the gateway BR1 deletes the entry for the path to the terminal segment C.1 that was added when the terminal 1 made a connection with the gateway BR1. If the previous gateway BRx is recorded in the entry for the terminal 1 in the terminal control table of the gateway BR1, the instruction for updating the routing table is sent to that gateway BRx (STEP II-10).

If the gateway BR2 already has had the entry for the terminal segment C.1 of the terminal 1 at the time when the terminal 1 makes the connection with the BTS AP2, the gateway BR2 resets the number of times of the movement to the initial value.

At this time, the contents of the routing tables are the same as those shown in FIG. 3B.

Thus, the procedure of the movement of the terminal 1 is completed so as to conduct the data communication through the BTS AP2 and the gateway BR2 (STEP II-11).

As described above, even if the terminal 1 changes the BTS segment to be connected, the gateways BRx and the terminal router CR1 update their own routing table so that the new path information is transmitted on the Internet 2. Since the objects, such as the application 11, which belong to the terminal segment C.1, can conduct the data communication by usually using the group of the constant terminal specific addresses, the communication is prevented from being lost.

Moreover, by keeping the old path information for a while after the terminal 1 moves so as to use the tunneling, the communication is prevented from being lost until the new path information is transmitted through the Internet 2 entirely. Even if there is the old path information and the new path information at the same time, the data relay device can recognize the new path information as the proper information by changing the metric value for the old path. Thus, the frequency for using the new path becomes higher than that for using the old one, so that the efficiency of the data communication is improved.

As described above, the old path information can be deleted when the item of the entry in the routing table or the terminal control table reaches the predetermined value, thereby preventing the old path information from remaining forever. Accordingly, the efficiency of the data communication is improved.

The effects above described can be achieved with a simple structure relatively without special structure except ones in the gateway BRx and terminal 1.

(Second Embodiment)

Figure 7:
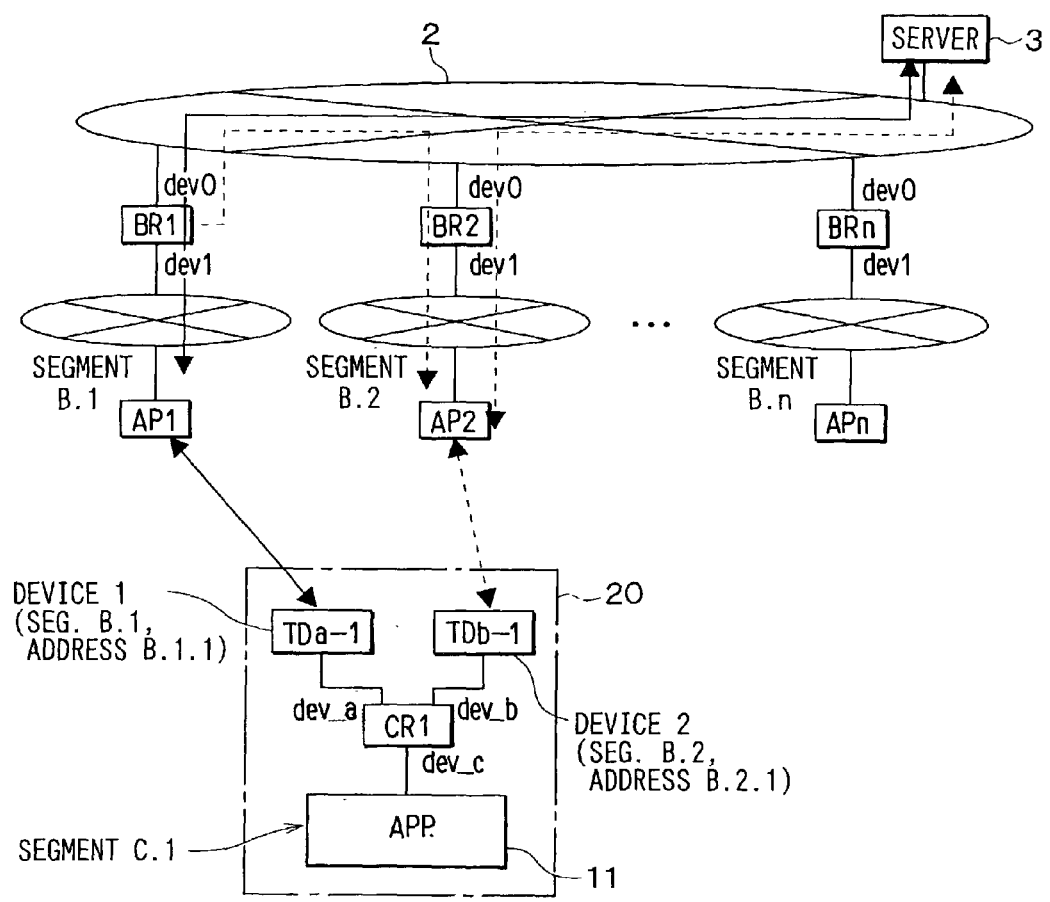
FIG. 7 is a diagram showing a data communication network in a second embodiment of the present invention.

As shown in FIG. 7, a terminal 2 has two radio devices TDa-1 and TDb-1 so as to conduct the data communication by using either one according to the condition of the communication in the second embodiment.

The structure or the function of each BTS APx, each segment B.x, each gateway BRx, the Internet 2 and a server 3 is the same as each one in the first embodiment, and therefore, the detailed description thereof will be omitted. Also, the parts in the terminal 2 that are the same as the ones in the first embodiment will not be described. Namely, the terminal router CR1 for relaying the data, the terminal segment C.1 and the application 11 belonging to the segment C.1 are the same as those in the first embodiment. The relationships of connection among these three items are also the same as that in the first embodiment.

The radio devices TDa-1 and TDb-1 are for communicating with the BTS APx by radio communication. These devices TDa-1 and TDb-1 are connected to the BTS APx independently from each other.

Each radio device TDa-1 and TDb-1 is provided with a temporary terminal IP address by the DHCP procedure when performing radio communication with the BTS APx. The temporary terminal IP address is used only when the terminal 2 is located within the area of the segment B.x to which the terminal 2 is connected. Therefore, when the segment B.x is switched from one to the other due to the movement of the terminal 2, the IP address changes.

The terminal segment C.1 can use a terminal specific IP address group as an aggregate of address that does not change even when the terminal 2 switches the connecting segment B.x from one to the other. One of the aggregate of address is used as a terminal specific IP address in the application 11. The application 11 communicates with the server 3 using this IP address.

The terminal router CR1, which is a relaying device between the terminal segment C.1 and either one of the radio devices TDa-1 and TDb-1, uses, for the purpose of data relay, a device dev_c as a network interface at a terminal segment C.1 side, a device dev_a as another name of the radio device TDa-1 to serve data to and receive data from respective segments at both device sides, and a device dev_b as another name of the radio device TDb-1 to send data to and receive data from the respective segments at both device sides.

Moreover, the terminal router CR1 has a routing table similar to that in the first embodiment.

Where the terminal performs the data communication, two situations are proposed for the radio devices TDa-1 and TDb-1. One of them is where the one of two devices communicates with the BTS APx, and the other is where both of the two communicate with the respective B.T. stations APx different with each other, for example, AP1 and AP2. By utilizing this situation, losing communication during a handover can be prevented from occurring.

As a concrete example, the switching of data communication based on the communicating condition of the terminal 2 will be described, together with change in each routing table of the gateways BR1 and BR2, and the terminal router CR1. Assuming the situation where, first, the terminal 2 is turned on to start data communication within a servicing area where the terminal 2 can communicate with the BTS AP1, then, enters in a servicing area where the terminal 2 can communicate with both B.T. stations AP1 and AP2, and finally, enters a servicing area where the terminal 2 can communicate with the BTS AP2.

When the terminal 2 is turned on to start data communication within the servicing area of the BTS AP1, the routing tables of the gateways BR1 and BR2, and the terminal router CR1 are the same as those shown in FIG. 3A. The application 11 can communicate with the Internet 2 through the device TDa-1 and the gateway BR1 since the path information in a routing table is transmitted through the Internet 2. On the other hand, the radio device TDb-1 does not communicate with any base transceiver station at that time.

When the terminal 2 enters the servicing area of both B.T. stations AP1 and AP2, the radio device TDb-1 performs the connecting procedure with the BTS AP2, and an entry for the segment B.2 is added to the routing table of the terminal router CR1. This entry becomes the path information that the data is directly sent from the device dev_b, i.e., the radio device TDb-1 to the segment B.2. The routing tables of the gateways BR1 and BR2 do not change.

Figure 8:
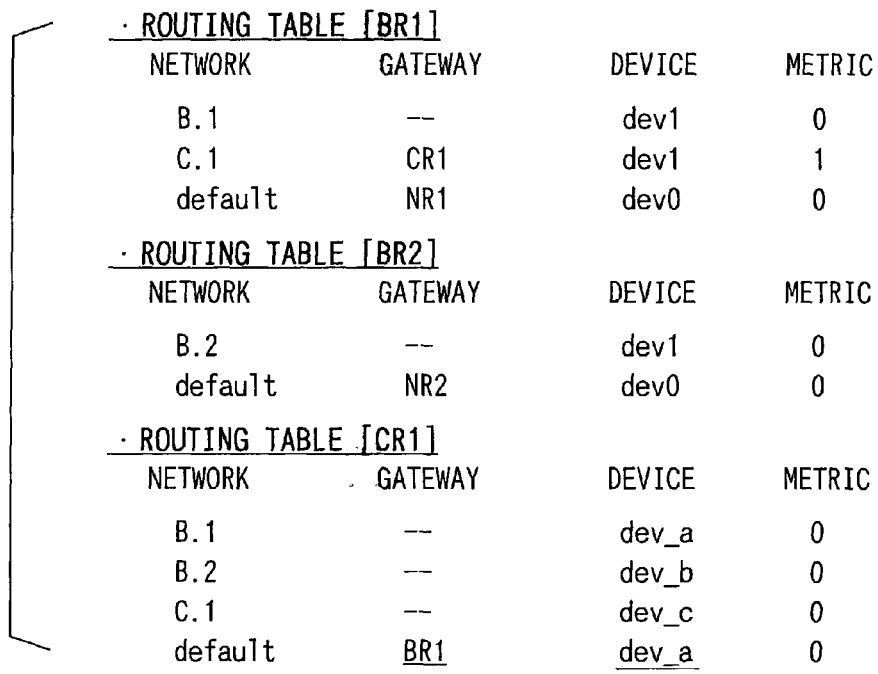
FIG. 8 is a sample of a routing table showing a relationship between base transceiver station gateways BRx and a terminal router CR1.

Each routing table of the gateways BR1 and BR2, and the terminal router CR1 at that time is shown in FIG. 8. The reason why the routing table of the gateway BR2 does not change is that the data communication using the gateway BR2 has not been conducted.

After that, the terminal 2 further moves to get into the area only of the BTS AP2. At this point, the terminal 2 cannot use the radio device Tda-1, but can use the radio device Tdb-1 immediately that has completed the connecting procedure so as to perform the data communication. The routing tables at that time are the same as those shown in FIG. 3B in a condition that the device dev_a of the CR1 should be replaced with the device_b. Namely, an entry of the gateway BR2 for the terminal segment C.1 is added to send the data through the terminal router CR1 using the device dev1, while the entry in the terminal router CR1 for the segment B.1 is deleted.

Similar to the first embodiment, the entry of the routing table in the gateway BR1 for the terminal segment C.1 is not deleted for a while to prevent the data communication from being lost.

Figure 9:
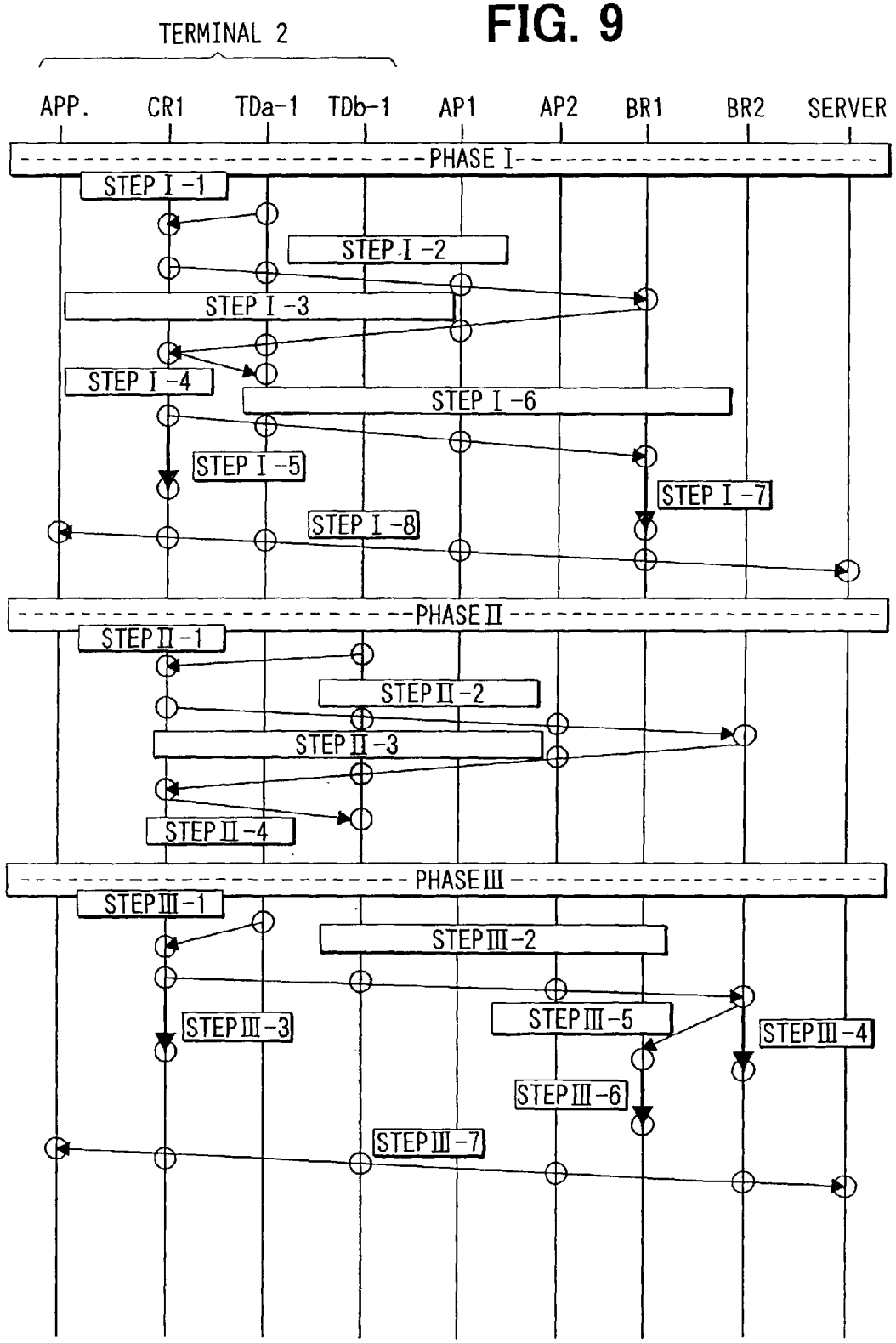
FIG. 9 is a diagram showing data communication of the second embodiment of the present invention when a terminal moves from one base transceiver station gateway to the other base transceiver station gateway.

The timing of updating of the routing table described above or the other process is shown in FIG. 9. The process is for communicating the data among the terminal 20, the B.T. stations AP1 and AP2, the gateways BR1 and BR2, and the server 3. However, the same steps or the equal steps as that shown in FIG. 6 are omitted.

Figure 6:
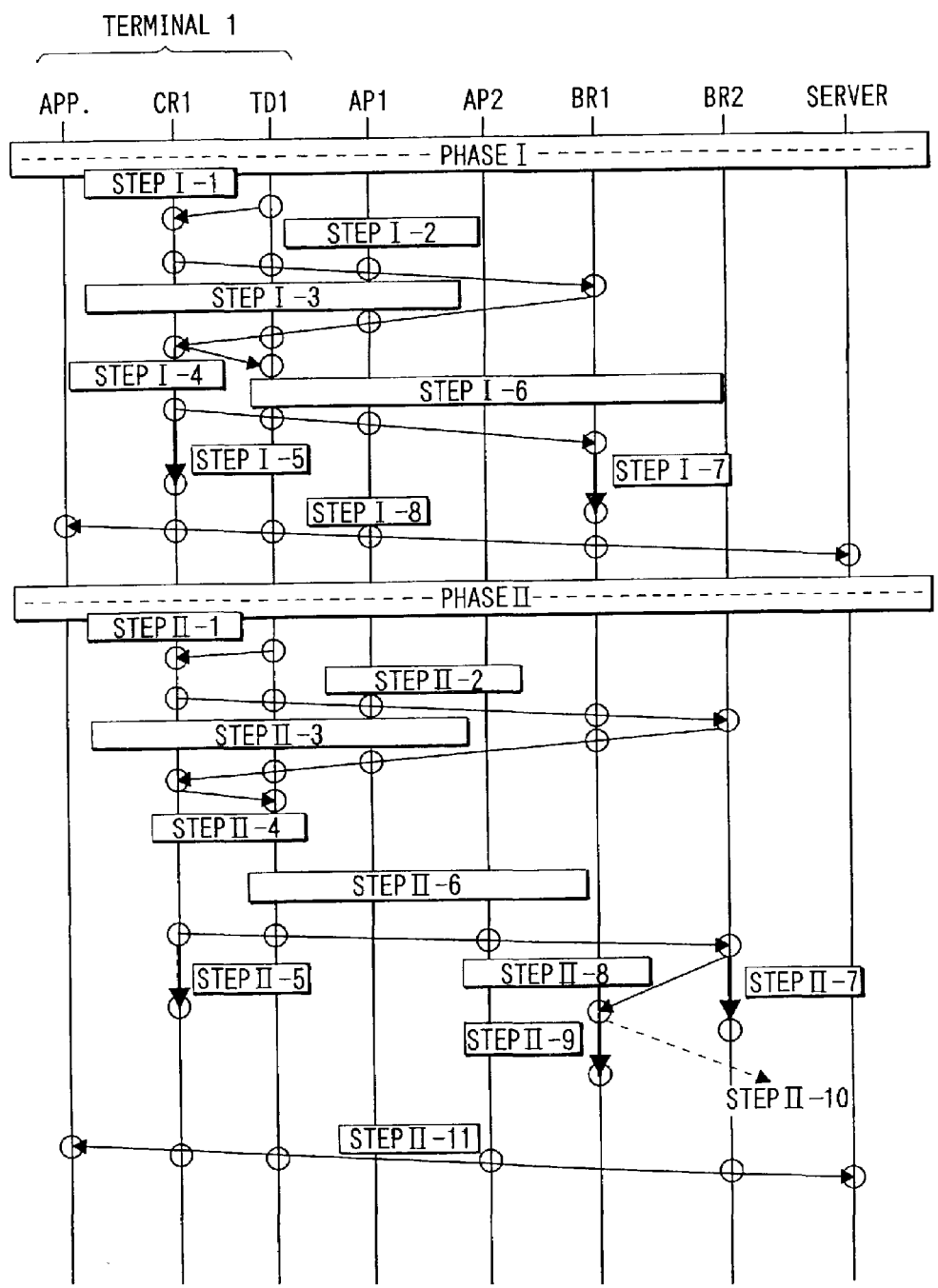
FIG. 6 is a diagram showing data communication of the first embodiment of the present invention when a terminal moves from one base transceiver station gateway to the other base transceiver station gateway.

First, the phase I, i.e., the case where the terminal 20 is turned on within an area where the terminal 20 be able to communicate with the BTS AP1 is the same as that shown in FIG. 6 in a condition where the radio device TD1 is replaced with the radio device Tda-1. Thus, the application 11 in the terminal 20 can communicate with the server 3 through the radio device TD1 and the gateway BR1. The routing tables at that time are the same as those shown in FIG. 3A.

Following the phase I, the terminal 20 gets into the area where the terminal 20 can communicate with both of the B.T. stations AP1 and AP2. The radio device TDb-1 informs the terminal router CR1 of the fact that the BTS AP2 is available. Receiving that notice, the terminal router CR1 sends the request to get the temporary terminal IP address for the radio device TDb-1 to the gateway BR2 through the gateway BR1 from the segment B.1 (STEP II-2). Responding to the request, the terminal router CR1 provides the temporary terminal IP address and informs the IP address of the gateway BR2 (STEP II-3). At that time, the connecting procedure is completed, and therefore, the routing tables are set shown as FIG. 8. Namely, an entry in the terminal router CR1 for the segment B.1 is newly added.

After that, the terminal 20 further moves to get into the servicing area only capable of communicating with the BTS AP2. At this moment, the radio device TDa-1 informs the terminal router CR1 of the fact that the BTS AP1 is not available for conducting the communication (STEP III-1). Responding to the notice, the terminal router CR1 declares to use the BTS AP2, and informs the gateway BR2 of the terminal segment C.1 and the temporary terminal address of the radio device TDb-1 (STEP III-2), and also updates its own routing table (STEP III-3). In this connection, the gateway BR2 updates the its own routing table and adds a new entry for the terminal segment C.1 in the terminal control table (STEP III-4). In this situation, the gateway BR1 is recorded as a previous gateway BRX corresponding to the terminal segment C.1. Following this step, the gateway BR2 sends the gateway BR1 the notice of the movement of the terminal 20 for informing of the new temporary terminal IP address as the new connected object after the gateway BR1 or the IP address of the gateway BR2 (STEP III-5).

In association with this notice, the gateway BR1 updates the routing table based on the notice from the gateway BR1, and increases the number of times of the movement of the terminal by one that is recorded in the entry for the terminal segment C.1 of the terminal control table (STEP III-6). In a situation where this number of times of the movement reaches the predetermined value, the gateway BR1 deletes the entry for the path to the terminal segment C.1. If the previous gateway BRx is recorded in the entry for the terminal 20 in the terminal control table of the gateway BR1, the instruction for updating the routing table is sent to that gateway BRx.

At this time, the contents of the routing tables are the same as those shown in FIG. 3B in the condition where the dev_a is replaced with the dev_b.

Thus, the procedure of the movement of the terminal 20 is completed so as to conduct the data communication through the radio device TDb-1, the BTS AP2 and the gateway BR2 (STEP III-7).

Figure 10:
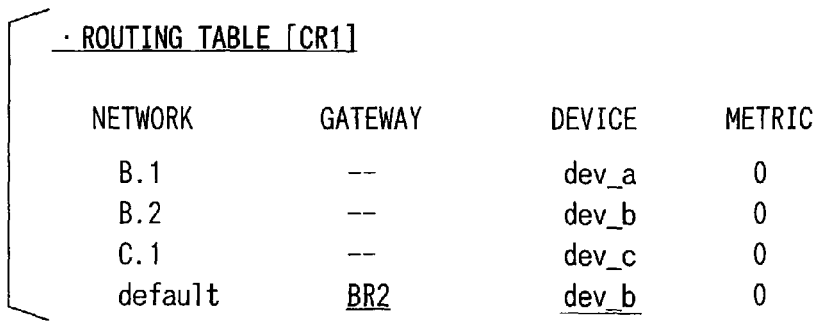
FIG. 10 is a sample of a routing table of the terminal router CR1 in the second embodiment.

The timing for switching from the radio device TDa-1 to the radio device TDb-1 for the data communication is not necessarily conducted at the time when the radio device TDa-1 is not available. Namely, the timing for switching from the radio device TDa-1 to the radio device TDb-1 for the data communication may be conducted at the time before the terminal 20 gets out of the area of the BTS AP1. For example, this switching can be conducted when the communication condition with the BTS AP2 becomes better than that with the BTS AP1. Where the switching is performed before the BTS AP1 becomes the non-available condition, the entry for the segment B.1 is left in the routing table of the terminal router CR1 just after the switching is performed. The routing table of the terminal router CR1 a that time is shown in FIG. 10.

As described above, even if the terminal 20 changes the BTS segment to be connected, the gateways BRX and the terminal router CR1 update their own routing tables so that the new path information is transmitted on the Internet 2. Since the objects, such as the application 11, which belong to the terminal segment C.1, can conduct the data communication by usually using the group of the constant terminal specific addresses, the communication is prevented from being lost. Moreover, by keeping the old path information without deleting this information for a while after the terminal 20 moves so as to use the tunneling, the communication is prevented from being lost until the new path information is transmitted through the Internet entirely. Even if the old path information and the new path information exist at the same time, the data relay device can recognize the new path information as the proper information by changing the metric value for the old path. Thus, the frequency for using the new path becomes higher than that for using the old one, so that the efficiency of the data communication is improved. Similar to the first embodiment, the same efficiency of the first embodiment can be achieved in the second embodiment.

In addition, the communication while the handover is conducted can be restrained from being lost since the terminal 20 has plural radio devices, such as TDa-1 and TDb-1, by making a connection with the next BTS APx using the one of the radio devices while the terminal 2 already has conducted the data communication with the first BTS APx.

(Third Embodiment)

Figure 11:
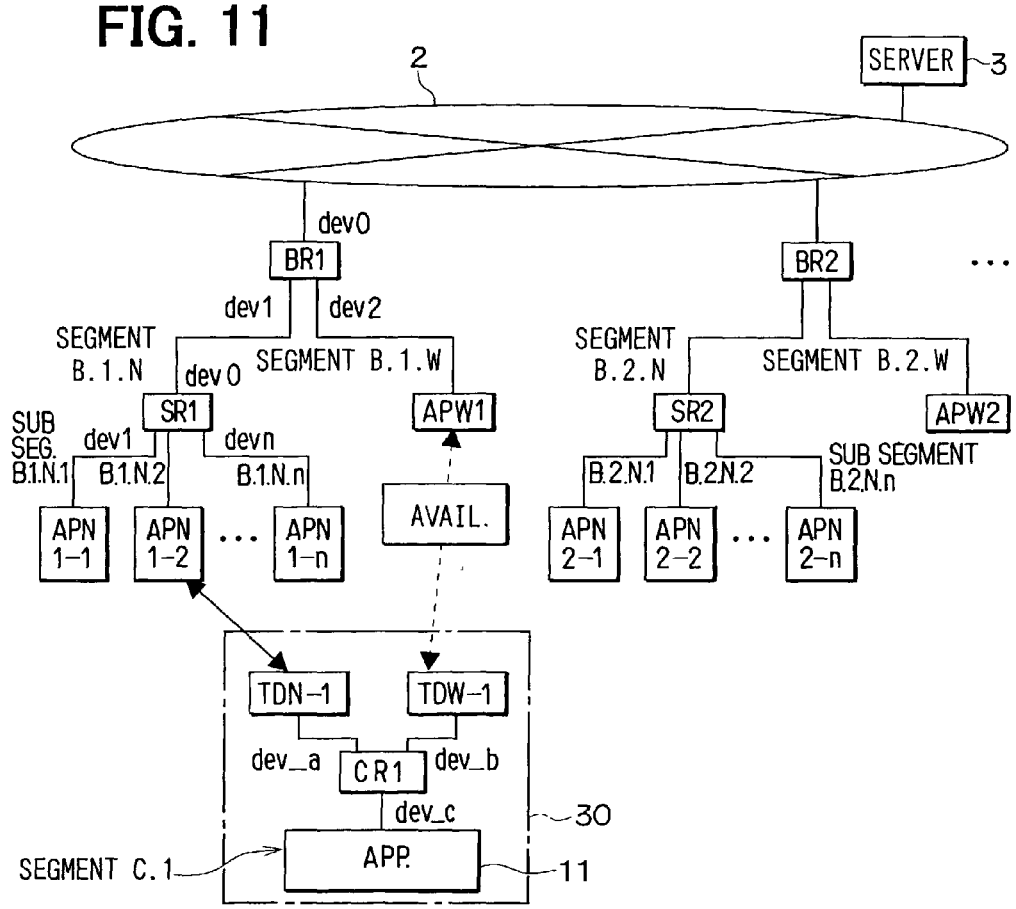
FIG. 11 is a diagram showing a data communication network in a third embodiment of the present invention.

As shown in FIG. 11, a terminal 30 has two radio devices TDN-1 and TDW-1 that are used for connecting the different networks of the different systems, respectively, to conduct the data communication. Basically, this configuration is useful to prevent the communication from being lost.

The structure or the function of the Internet 2 or a server 3 is the same as each one in the first or second embodiment, and therefore, the detailed description thereof will be omitted. Also, the other parts that are identical to, or similar to those in the first or second embodiment will be not described.

The server 3 and the gateways BRx are connected through the Internet 2. The gateway BRx is connected to a wide base transceiver station APW1, APW2, . . . (hereinafter, referred to as a w-BTS APWx or a wide B.T. station APWX) through a wide base transceiver segment B.1.W, B.2.W, . . . (hereinafter, referred to as a w-segment B.x.W) while being connected to plural base transceiver station routers SR1, SR2, . . . (hereinafter, referred to as a BTS router SRx) through a narrow BTS segment B.1.N, B.2.N, . . . (hereinafter, referred to as a n-segment B.x.N). The BTS router SRx is connected to narrow base transceiver stations APN1-1, APN1-2, . . . , or APN2-1, APN2-2, . . . (hereinafter, referred to as a n-BTS APNx-y or a narrow B.T. station APNx-y) through sub base transceiver station segments B.1.N.1, B.1.N.2, . . . , or B.2.N.1, B.2.N.2, . . . (hereinafter, referred to as a sub-segment B.x.N.y), respectively, as shown in FIG. 11.

The terminal 30 conducts the communication with the Internet 2 through the BTS router SRx or the gateway BRx by being connected to the n-BTS APNx-y or the w-BTS APWX by radio communication. The radio device TDN-1 is used for connecting the terminal 3 with the n-BTS APNx-y, while the radio device TDW-1 is used for connecting the terminal 30 with the w-BTS APWX. The terminal router CR1, the terminal segment C.1, the application work similar to those described in the second embodiment.

Each radio device TDN-1 and TDW-1 is provided with a temporary terminal IP address by the DHCP procedure when performing radio communication with the n-BTS APNx-y and the w-BTS APWx, respectively. The temporary terminal IP address is used only when the terminal 30 is located within the area of the sub-segment B.x.N.y or the w-segment B.x.W to which the terminal 30 is connected. Therefore, when the sub segment B.x.N.y or the w-segment B.x.W is switched from one to the other due to the movement of the terminal 30, the IP address changes.

The terminal segment C.1 can use a terminal specific IP address group as an aggregate of addresses that does not change even when the terminal 30 switches the connecting segment, for example, the sub segment B.x.N.y or the w-segment B.x.W from one to the other. One of the aggregate of addresses is used as a terminal specific IP address in the application 11. The application 11 communicates with the server 3 using this IP address.

The terminal router CR1, which is a relaying device between the terminal segment C.1 and either one of the radio devices TDN-1 and TDW-1, uses, for the purpose of data relay, a device dev_c as a network interface at a terminal segment C.1 side, a device dev_a as another name of the radio device TDN-1 to serve data to and receive data from respective segments at both device sides, and a device dev_b as another name of the radio device TDW-1 to conduct service of data to and receipt of data from the respective segments at both device sides.

Moreover, the terminal router CR1 has a routing table similar to that in the first or second embodiment for the same purpose thereof. Also, the terminal router CR1 communicates with the BTS router SRx to which the n-BTS APNx-y is connected through the sub segment B.x.N.y, or communicates with the segment BRx to which the w-BTS APWx is connected through the w-segment B.x.W. The structure of the routing table of each of these data relay devices is the same as that described in the first or the second embodiment.

The gateway BRx is a relaying device between the Internet 2 and either one of the n-segment B.x.N and the w-segment B.x.W. For the purpose of data relay, the gateway BRx has a device dev0, and devices dev1 and dev2 as a network interface at a Internet side, a n-segment B.x.N side and a w-segment B.x.W side, respectively, as shown in FIG. 11, so as to send the data to and receive the data from both sides. A device dev_a serves as another name of the radio device TDN-1 to send data to and receive data from respective segments at both device sides, and a device dev_b serves as another name of the radio device TDW-1 to send data to and receive data from the respective segments at both device sides.

The gateway BRx has a terminal control table. The terminal control table keeps a record of each entry. Each entry includes a relationship among the segment C.1 of the terminal 30 which was connected to the w-segment B.x.W or the sub segment B.x.N.y in past times which is under the gateway BRx, a gateway BRx other than this one under which the terminal 30 had been just prior to this gateway BRx, and the number of times of terminal movement that denotes the number of times that the terminal 30 changed the gateway BRx to be connected after having been under this gateway BRx for the last time. The structure of the terminal control table is the same as that in the first or the second embodiment.

By checking this table, the history of connection to an object, such as the data relay device, to which the terminal 30 has been connected can be recognized. The entry in which the number of the times of the terminal movement is equal to or more than the predetermined times can be deleted in the terminal control table.

When the gateway BRx receives the communication data through the Internet 2 that is addressed to the terminal segment C.1 of the terminal 30 which was under this gateway BRx in past times, the gateway BRx sends the communication data to a new temporary terminal IP address of the terminal 3 using the tunneling by rewriting the address accompanied to the communication data. Also, when the gateway BRx receives the transferred data whose address is rewritten, the gateway BRx also has a routing table for the path information, and conducts the dynamic routing similar to the first and second embodiments.

The entry for the terminal segment C.1 of the terminal 30 is added to the routing table of the gateway BRx under which the terminal 30 is located, and this entry is deleted when the predetermined time elapses after the terminal 30 moves to the other gateway BRx from this gateway BRx. Similar to the first and second embodiments, this predetermined time is the period that the number of times the terminal 30 changes the gateway BRx to be connected after the entry for the terminal 3 is added in the routing table of this gateway BRx reaches the predetermined value. The determination whether this number of times reaches the predetermined value or not can be known in association with the number of times of the movement of the terminal recorded in the entry of the terminal control table.

Where the radio device TDN-1 or TDW-1 having the new temporary terminal address starts the data communication when the terminal 3 moves within the segment under the same gateway BRx so as to change the object to be connected, the terminal control table of the gateway BRx is not changed, but the gateway portion of the entry for the terminal segment C.1 is changed to have the new temporary address.

The BTS router SRx is a relaying device between the n-segment B.x.N and the sub segment B.x.N.y for data communication. For the purpose of data relay, a device dev0 is equipped as a network interface at a narrow segment B.x.N side. Also, a device dev1, dev2, . . . , or devn is equipped at the sub segments B.x.N.y, respectively, to serve data to and receive data from respective sides with the device dev0.

In this embodiment, the BTS router SRx also serves as the DHCP server so as to provide a temporary terminal IP address that can be used within the area of the sub segment B.x.N.y to the terminal 30 which makes a connection through the n-BTS APNx-y.

Like the gateway BRx, the BTS router SRx has a routing table to store the path information so that the communication data can be delivered to the destination, and the BTS router SRx conducts the dynamic routing.

When the other terminal 30 makes a connection with a n-BTS APNx-y that is under the same segment to which the BTS router SRx belongs, the BTS router SRx adds an entry for a terminal segment C.1 of the other terminal 30 to the routing table, and the BTS router SRx deletes the entry immediately when the other terminal 30 leaves the n-BTS APNx-y.

Each n-BTS APNx-y, which is an access point for radio communication of the radio device TDN-1, and which is connected to the BTS router SRx through the sub segment B.x.N.y, has a relatively narrow servicing area. As a whole, the servicing areas of the narrow B.T. stations APNx-y are discrete. On the other hand, the communication speed is relatively fast. The communication system having this type of the n-BTS APNx-y is, for example, DSRC (Dedicated Short Range Communication).

Each w-BTS APWx, which is an access point for radio communication of the radio device TDW-1, and which is connected to the gateway BRx through the w-segment B.x.W, has a relatively wide servicing area. As a whole, the servicing areas of the wide B.T. stations APWX covers a wide area so that the little area is not covered, thereby conducting the exhaustive communication. On the other hand, the communication speed is relatively slow. The communication system having this type of the w-BTS APWx is, for example, a cell phone system or PHS (Personal Handyphone System).

In a case where the data communication is kept while the terminal 30 moves by switching between two types of communication system such as the n-BTS APNx-y and the w-BTS APWX, the terminal 30 can conduct the data communication by using the radio device TDN-1 while being in the servicing area of the n-BTS APNx-y which has the fast communication speed, and by using the radio device TDW-1 while being in the servicing area of the w-BTS APWX which has the slow communication speed. Thus, the efficiency of the data communication can be improved.

Figure 12:
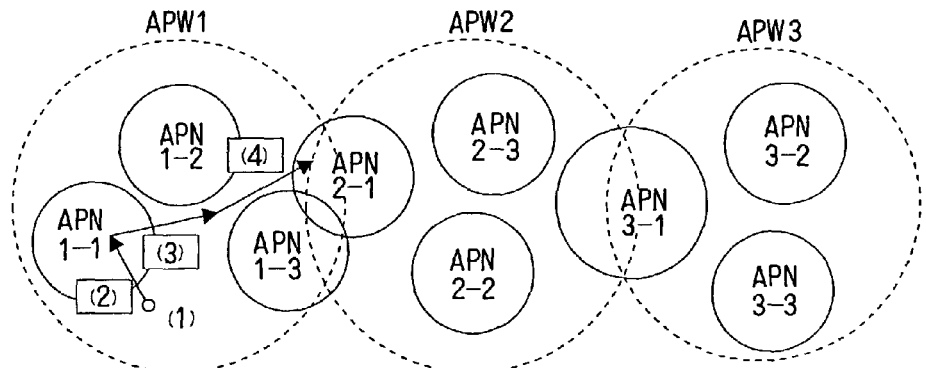
FIG. 12 is a sample of a cell-arrangement of base transceiver stations in different networks.

As understood from a sample arrangement of the servicing area of the two types of communication system, the n-BTS APNx-y and the w-BTS APWX as shown in FIG. 12, the servicing area of the n-BTS APNx-y is small and discrete, while the servicing area of the w-BTS APWX is large. Moreover, the overlapping portions between adjacent wide B.T. stations APWx is covered by the narrow B.T. stations APNx-y.

In this arrangement, when the terminal 30 moves so as to change the connection from one gateway BRx to the other BRx, for example, as a case where the terminal 30 moves so as to change the connection from the n-BTS APN1-3 to the n-BTS APN2-1, or a case where the terminal 30 moves so as to change the connection from the w-BTS APW2 to the n-BTS APN3-1, the change in the routing tables or the terminal control tables of the gateways BRx before and after moving of the terminal 30, and the exchange of the data between each device are the same as those in the first or the second embodiment in a condition where the BTS APx is replaced with the n-BTS APNx-y and the w-BTS APWx.

Assume the case of movement between the n-BTS APNx-y and the w-BTS APWx under the same gateway BRx. Since the communication data always passes through the same gateway BRx, it is not necessary, similar to the first and second embodiment, to rewrite the terminal control table of the gateway BRx. It is only necessary to rewrite the gateway portion in the entry for the terminal segment C.1 immediately after the base transceiver station to be connected is switched from the one to the other. For example, assume the case where the terminal 3, first, conducts the data communication within the servicing area of the n-BTS APN1-1, the terminal 30 gets out of the area of the n-BTS APN1-1 and makes a connection with the w-BTS APW1 as shown in FIG. 12. The routing tables of the BTS router SR1, the gateway BR1, the terminal router CR1 are shown in FIG. 13. In this table, the metric value is omitted to simplify itself.

FIG. 13A shows the case the terminal 30 conducts the data communication through the n-BTS APN1-1 using the radio device TDN-1. Since the BTS router SR1 and the terminal 30 are connected to the same sub segment B.1.N.1, the path to the terminal segment C.1 goes through the terminal router CR1 at first using the device dev1.

The gateway BR1, at its opposite side of the Internet 2, is connected to the w-segment B.1.W to which the w-BTS APW1 belongs, and the n-segment B.1.N connected to the n-BTS APN1-1 through the sub segment B.1.N.1. Therefore, the gateway BR1 has the entries for the B.1.N, B.1.W and the entry for the terminal segment C.1 that is sent the data to the BTS router SR1 at first.

The terminal router CR1 is within the servicing area of the n-BTS APN1-1 and the servicing area of the w-BTS APW1 at the same time, and therefore, the connecting procedure for both B.T. stations is completed using the radio devices TDN-1 and TDW-1 by radio communication. However, the connection that is used in this situation is the one that goes through the sub segment B.1.N.1 recorded in the routing table of the gateway BR1.

FIG. 13B shows the case the terminal 30 is not within the servicing area of the n-BTS APN1-1, and conducts the data communication through the w-BTS APW1 using the radio device TDW-1. The different points in this figure will be described mainly as compared with FIG. 13A.

In the BTS router SR1, the terminal 30 leaves, and any terminal having a connection with the router SR1 does not exist. Therefore, the entries for the terminal segment C.1 and the sub segment B.1.N.1 are deleted.

In the gateway BR1, the contents of the entry for the terminal segment C.1 that makes a new connection with the w-BTS APW1 are changed. The gateway portion of the entry is changed to have the terminal router CR1, and the device portion thereof is changed to have the device dev2 that is the interface at the w-segment side.

Since the terminal router CR1 is outside of the area of the n-BTS APN1-1, the entry for the BTS router SR1 to which the radio device TDN-1 is connected does not exist in the routing table. In this case, the terminal router CR1 conducts the data communication through the w-segment B.1.W recorded in the routing table of the gateway BR1 by using the radio device TDW-1.

Figure 14:
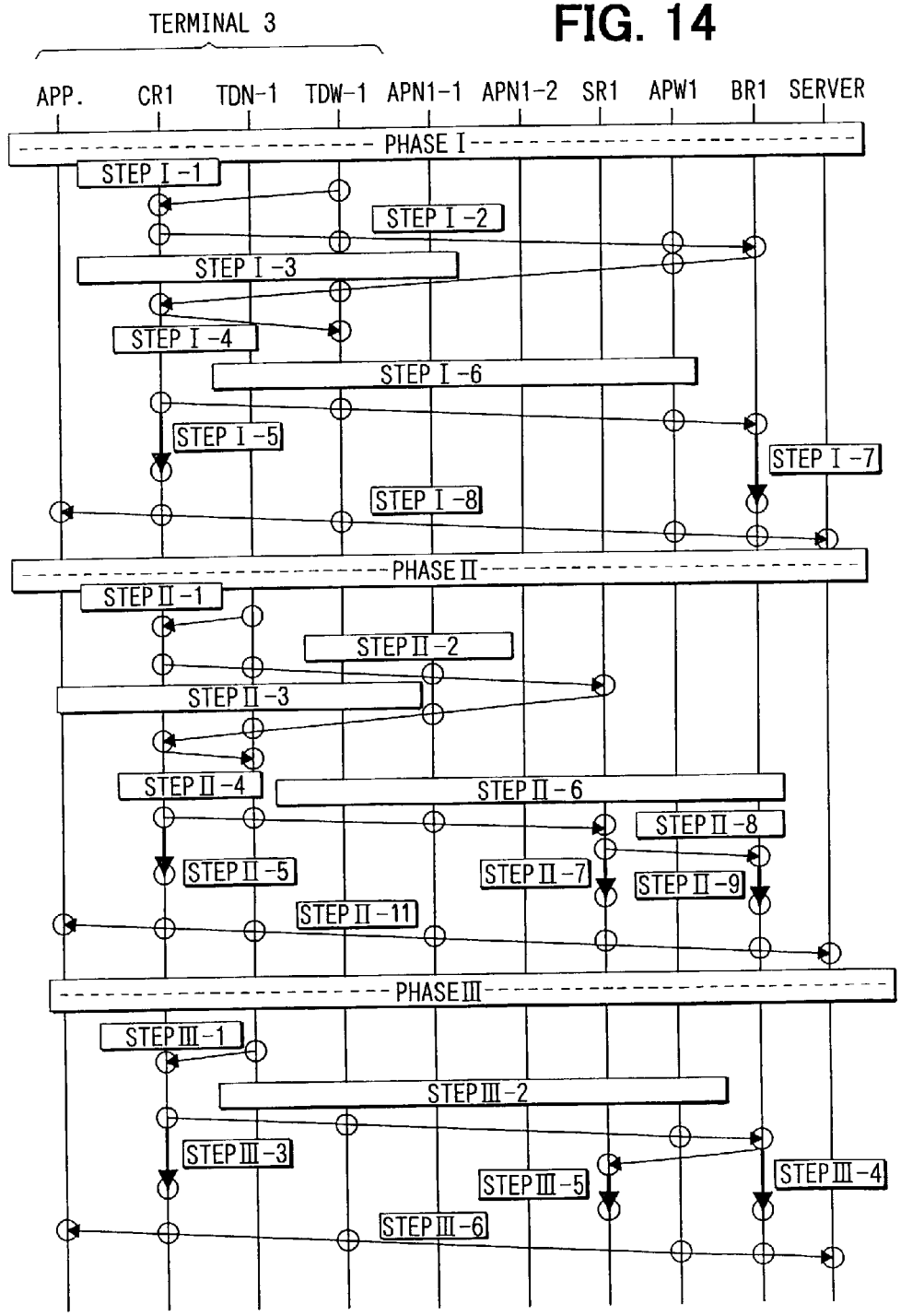
FIG. 14 is a diagram showing data communication of the third embodiment of the present invention when a terminal moves within a cell in a base transceiver station APW1.

The process for communicating the data among the communication devices described above will be described with reference to FIGS. 14 and 15. This process is a sample for the arrangement shown in FIG. 12. More specifically, the case is shown where the terminal 30 moves as following arrows shown in FIG. 12, i.e., from APW1(1)→APN1-1(2)→APW1(3)→APN2-1(4). The explanation the same as or similar to that described in the first or the second embodiment will be omitted.

First, the terminal 30 is turned on within the area of the w-BTS APW1 (PHASE I). The radio device TDW-1 is provided with a temporary terminal IP address from the gateway BR1, so that the routing tables of the gateway BR1 and the terminal router CR1 are updated (STEP I-1,2,3). At this moment, these routing tables are the same as those shown in FIG. 13B. The other steps are the same as or similar to those shown in FIG. 6 or 9.

After that, the terminal 30 moves to get into the area of n-BTS APN1-1. Receiving the notice from the radio device TDN-1, the terminal router CR1 sends the request to get the temporary terminal IP address to the BTS router SR1, and the terminal router CR1 receive it (STEP II-2,3). Then, the routing tables of the terminal router CR1, the BTS router SR1, the gateway BR1 are updates to have contents as shown in FIG. 13A. In this case, it is not necessary to rewrite the terminal control table.

Further, the terminal 30 moves so that the n-BTS APN1-y is not available. The terminal router CR1, which receives the notice of non-availability of the radio device TDN-1 (STEP III-1) declares to use the w-BTS APW1 and informs the gateway BR1 of the temporary terminal IP address that was used in past times to conduct the data communication with the w-BTS APW1. Then, the routing tables of the terminal router CR1, the BTS router SR1, the gateway BR1 are updates to have contents as shown in FIG. 13B.

Figure 15:
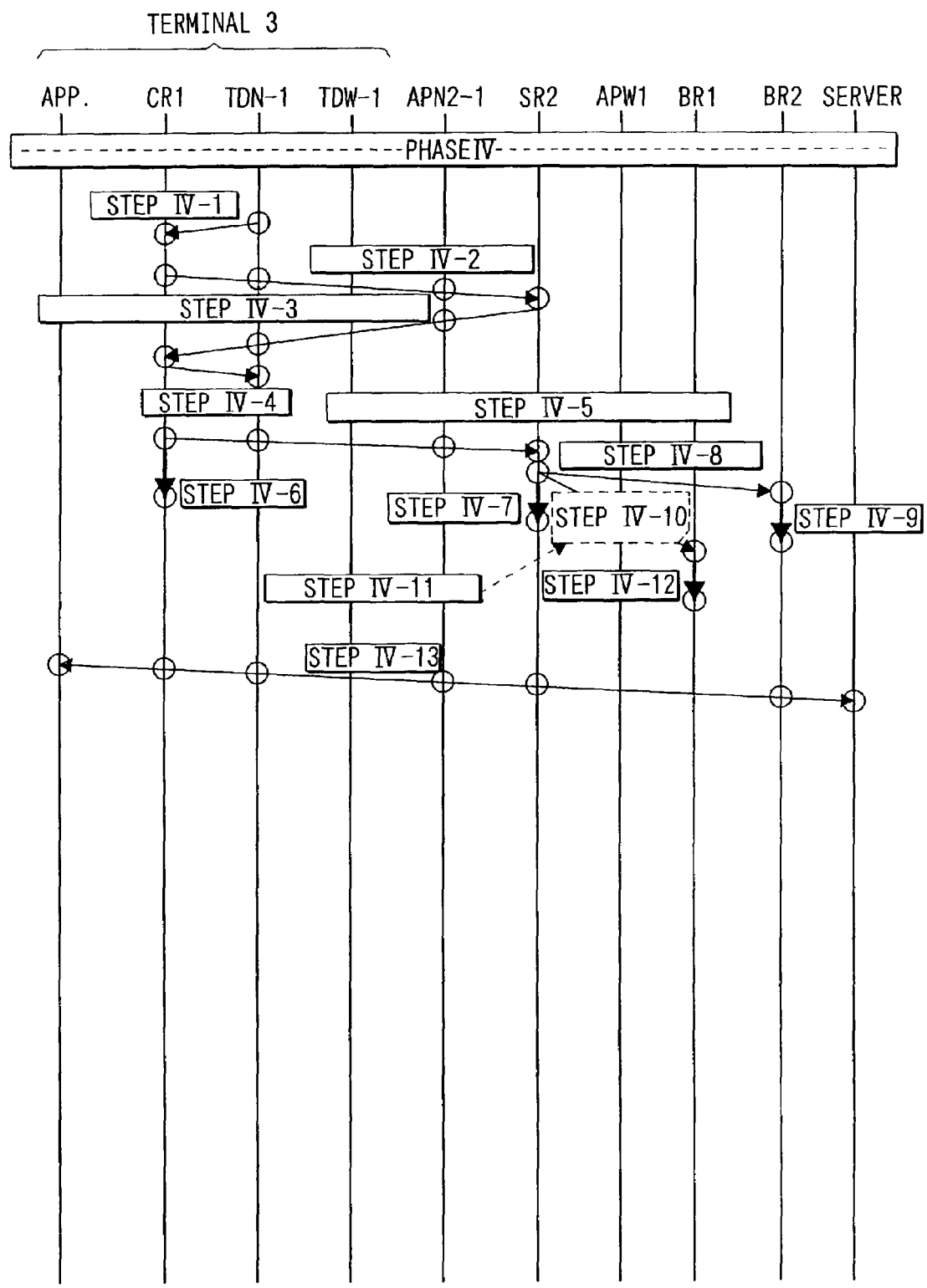
FIG. 15 is a diagram showing data communication of the third embodiment of the present invention when a terminal moves within a cell in a base transceiver station APW1.

Following the phase III, the terminal 30 moves to get into the area of n-BTS APN2-1 that belongs to the other group while conducting the data communication with the w-BTS APW1. As shown in FIG. 15, the terminal router CR1, which receives the notice of availability of the n-BTS APN2-1 from the radio device TDN-1 (STEP IV-1), sends the request for the temporary terminal IP address and get it (STEP IV-2, IV-3), and declares to use the n-BTS APN2-1 (STEP IV-5). In this case, the change in routing table is conducted at the gateway BR1 (STEP IV-12) and the BTS router SR1 (STEP IV-11) with which the terminal 30 had the communication previously after receiving the notice of the terminal movement from the gateway BR2 as the routing update instruction(STEP IV-10) as well as the gateway BR2 (STEP IV-9) after receiving the notice (STEP IV-8), the BTS router SR2 (STEP IV-7) and the terminal router CR1 (STEP IV-6). The terminal control tables of the gateways BR2 and BR1 are also updated.

The routing tables after updating are shown in FIG. 16.

The routing tables of the BTS router SR2 and the gateway BR2 changes, respectively, at the portion of the segment name from B.1.... to B.2.... and at the portion of the upper router from the NR1 to NR2 when being compared to the BTS router SR1 and the segment BR1 in FIG. 13A, while the other parts thereof are the same as those of the BTS router SR1 and the segment BR1 in FIG. 13A. The routing table of the BTS router SR1 is the same as that shown in FIG. 13B since any terminal 30 is not connected to it. The routing table of the gateway BR1 is the same as that shown in FIG. 3B, i.e., the table of the gateway BR1 when the terminal 1 moves from the BTS AP1 to the BTS AP2 in the first embodiment except the upper router is changed from the NR1 to the NR2. The routing table of the terminal router CR1 has entries for the sub segment B.2.N.1 and the w-segment B.1.W since the radio device TDW-1 is connected to the w-BTS APW1, and the radio device TDN-1 is connected to the n-BTS APN2-1.

As described above, in the movement under one gateway BRx shown as APW1(1)→APN1-1(2)→APW1(3)→APN2-1(4) in shown FIG. 12, the gateway BRx, the BTS router SR1 and the terminal router CR1 update their own routing tables, then, the new path information is transmitted through the Internet 2. Accordingly, the objects, such as the application 11, which belong to the terminal segment C.1, can conduct the data communication by usually using the group of the constant terminal specific addresses, the communication is prevented from being lost since the terminal 30 has the radio devices TDN-1 and TDW-1 that can work with the different systems.

Moreover, in the movement in which the terminal moves from one gateway BRx to the other gateway BRx, such as APWL(3)→APN2-1(4) in the FIG. 12, similar to the first or the second embodiment, the old path information is not deleted soon so as to be kept for a while after the terminal moves so as to use the tunneling. Therefore, the communication is prevented from being lost until the new path information is transmitted through the Internet entirely. Even if there are the old path information and the new path information at the same time, the data relay device can recognize the new path information as the proper information by changing the metric value for the old path. Thus, the frequency for using the new path becomes higher than that for using the old one, so that the efficiency of the data communication is improved. Also, the other effect common to the first and second embodiment can be obtained in this embodiment.

The servicing area for the n-BTS APNx-y is located at the overlapping areas of the servicing area for the adjacent wide B.T. stations APWx. When the radio device TDW-1 moves the connection from one w-BTS APWx to the other w-BTS APWx, the handover can be secured by changing the connection while the data communication is kept with the connection between the radio device TDN-1 and the n-BTS APNx-y. Therefore, the data communication is prevented from being lost.

In this embodiment, the BTS router SR1 is regarded as a router, i.e., a data relay device. Therefore, each n-BTS APNx-y can belong to different segment so that the BTS router SR1 can distribute the communication data to respective segments. As a result, the communication speed can be prevented from being lowered even if many terminal 30 are connected to the BTS router SR1. However, the BTS router is not necessarily the data relay device, the BTS router can be a hub. In this case, the n-BTS APNx-y is connected to the gateway BRx directly through one segment.

In the first through third embodiments, the Internet 2 denotes a wide area network, i.e., WAN. The narrow base transceiver station APNx-y and the wide base transceiver station APWx are base transceiver stations. The base transceiver station gateway BRx is a base transceiver station data relay device. The radio devices TD1, TDa-1, and TDb-1 are radio network interfaces. The radio devices TDN-1 and TDW-1 are ones for plural radio network interfaces, respectively. The terminal router CR1 is a terminal data relay device. The temporary terminal IP address is a temporary terminal address, and the terminal specific IP address is a terminal specific address. The group of the terminal specific addresses means one or more terminal specific addresses. The metric value is the path priority information. The optimum path retrieving algorithm is means for retrieving the optimum path. The combination of the terminal router CR1 and the terminal segment C.1 is one example of the data communication processing means. Each process in the gateway BRx constituting the base transceiver station data relay device and the terminal 1 (20 or 30) is means for achieving respective function thereof.

The other network, as long as it is composed of an aggregate of segments, can be the wide area network.

The gateway BRx in the above described embodiments is connected to the base transceiver station, such as the APx, APWx, or APNx-y, through two or less segments. However, the number of segments under the gateway is not limited to two.

The terminal router may be realized using software.

Although, the combination of the terminal router CR1 and the terminal segment C.1 constitutes the data communication processing means, it is not necessarily that the terminal router CR1, terminal segment C.1 and application 11 are apparently discrete. For example, the terminal router CR1 and application 11 is composed of one software that cannot be divided, and the terminal segment C.1 exists in the software as a virtual device. Namely, the terminal 1(20 or 30) may only have the radio network interface having a temporary terminal address and the data communication processing means having one or more terminal specific address.

The means for sending or receiving the communication data by connecting the terminal segment C.1 may be not the application 11, but a computer as a terminal device.

The terminal 1 (20 or 30) can be a cell phone, or a mobile object, such as a vehicle, a ship, a plane, that has a router and a transmitter for conducting communication with a base transceiver station. It does not matter that the terminal is realized by a hardware or a software, or that the size of the structure thereof is big or small.

Although the gateway BRx also serves as the DHCP server, the DHCP server can be the other network device.

In the first and second embodiments, the base transceiver station data relay device is composed of the gateway BRx. However, the data relay device may be the other device, such as a router, as long as the device can communicate with the other data relay device to exchange the path information, and has function for rewriting the routing table and the terminal control table.

In the second or the third embodiment, the radio device can be equipped to the terminal 2 or 3, more than two.

Only one example of the characteristic of the n-BTS APNx-y or the w-BTS APWx and arrangement of the cell is described in the third embodiment, they are limited to those described in the third embodiment.

While the present invention has been shown and described with reference to the foregoing preferred embodiment, it will be apparent to those skilled in the art that changes in form and detail may be therein without departing from the scope of the invention as defined in the appended claims.

What is claimed is:

1. A terminal for conducting data communication with a server on a wide area network by being connected to a base transceiver station using radio communication through a base transceiver station segment to which the base transceiver station belongs, the terminal comprising:

a radio network interface for connection using said radio communication;

data communication processing means for conducting a process for the data communication;

a temporary terminal address which changes when the radio network interface changes the base transceiver station segment to be connected from one to an other, and serving as an address for said radio network interface; and a terminal specific address which is constant when the radio network interface changes the base transceiver station segment to be connected from the one to the other, wherein the terminal specific address is used by the data communication processing means, wherein the terminal informs a data relay device, which serves for administrating a path for the data communication by exchanging path information for delivery of the communication data to a destination, of path information denoting a data communication path to the terminal specific address that goes through the temporary terminal address.

2. A terminal according to claim 1, wherein the data communication processing means comprises:
- a terminal segment as a specific network segment; and
- a terminal data relay device for relaying the data communication between the radio network interface and the terminal segment,
- wherein said terminal segment is capable of using one or more the terminal specific addresses.

3. A terminal according to claim 1, wherein said radio network interface is composed of a plurality of network interfaces for performing radio communication with different base transceiver stations simultaneously, wherein said radio network interface keeps the data communication by switching the plurality of network interfaces in association with a condition of the data communication.

4. A terminal according to claim 1, wherein said radio network interface is composed of a plurality of network interfaces, each of which is capable of being connected to a base transceiver station corresponding to different communication systems, respectively.

* * * * *